United States Patent
Bandou et al.

(10) Patent No.: US 7,135,518 B2
(45) Date of Patent: Nov. 14, 2006

(54) CURABLE COMPOSITIONS, SEALING MATERIAL, AND ADHESIVE

(75) Inventors: Akihiko Bandou, Osaka (JP); Masaya Kobayashi, Shiga (JP); Yukihiko Murayama, Shiga (JP); Takuto Ikeuchi, Shiga (JP); Tetsuya Kusano, Osaka (JP); Hideyuki Takahashi, Osaka (JP); Kouji Yamauchi, Shiga (JP); Takahiro Futamura, Shiga (JP); Satoshi Kusuda, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 31 days.

(21) Appl. No.: 10/490,618

(22) PCT Filed: Sep. 25, 2002

(86) PCT No.: PCT/JP02/09892

§ 371 (c)(1),
(2), (4) Date: Mar. 25, 2004

(87) PCT Pub. No.: WO03/029355

PCT Pub. Date: Apr. 10, 2003

(65) Prior Publication Data

US 2005/0261412 A1    Nov. 24, 2005

(30) Foreign Application Priority Data

Sep. 27, 2001  (JP) ............................. 2001-298034
Mar. 6, 2002   (JP) ............................. 2002-060811
Jun. 6, 2002   (JP) ............................. 2002-165999

(51) Int. Cl.
    *C08K 3/34*    (2006.01)
(52) U.S. Cl. ................... 524/445; 524/442; 524/443; 524/444; 524/447; 524/449
(58) Field of Classification Search ................ 524/445, 524/447, 442, 443, 444, 449
See application file for complete search history.

(56) References Cited

U.S. PATENT DOCUMENTS 5,760,106 A   6/1998  Pinnavaia et al.

6,197,849 B1  3/2001  Zilg et al.

FOREIGN PATENT DOCUMENTS

DE    1 277 564 A    6/1972

OTHER PUBLICATIONS

Patent Abstracts of Japan, vol. 0152 No. 72, Jul. 10, 1991 & JP 3 093542A (Toyobo Co Ltd), Apr. 18, 1991.
Patent Abstracts of Japan, vol. 0041, No. 13, Aug. 13, 1980, & JP 55 069617 A (Aica Kogyo Co Ltd), May 26, 1980.
Patent Abstracts of Japan, JP-6-234887, A and English Abstract thereof, dated Aug. 23, 1994, Mitsubishi Petroleum Co., Ltd.
Patent Abstracts of Japan, JP-2001-342201, A and English Abstract Thereof, dated Dec. 11, 2001, Danippon Ink & Chem., Inc., et al.
Patent Abstracts of Japan, JP-5-287186, A and English Abstract thereof, dated Nov. 2, 1993, Kanegafuchi Chem. Ind., Co., Ltd.
Patent Abstracts of Japan, JP-54-036395, A and English Abstract Thereof, dated Mar. 17, 1979, Kanegafuchi Chem. Ind., Co., Ltd.
Patent Abstracts of Japan, JP-57-179210, A and English Abstract thereof, dated Nov. 4, 1982, Sunstar Giken KK.
Patent Abstracts of Japan, JP-59-078222, A and English Abstract thereof, dated May 7, 1984, Sunstar Giken KK.
Patent Abstracts of Japan, JP-60-023405, A and English Abstract thereof, dated Feb. 6, 1985, Sunstar Giken KK.
Patent Abstracts of Japan, JP-11-130931, A and English Abstract thereof, dated May 18, 1999, Kanegafuchi Chem. Ind., Co., Ltd.
Patent Abstracts of Japan, JP-11-100433, A and English Abstract Thereof, dated Apr. 13, 1999, Kanegafuchi Chem. Ind., Co., Ltd.

*Primary Examiner*—Edward J. Cain
(74) *Attorney, Agent, or Firm*—Townsend & Banta

(57) ABSTRACT

Curable compositions capable of giving a cured article excellent in weatherability and flam retardancy. (1) One of the curable compositions comprises an organic polymer having at least one crosslinkable hydrolysable silyl group and phyllosilicate. It has enhanced weatherability due to incorporation of the phyllosilicate, and has further enhanced weatherability because the bleeding of an ultraviolet absober and a light stabilizer is inhibited. (2) The other composition comprises 100 parts by weight of a urethane resin, epoxy resin, and/or modified polysulfide resin and 0.1 to 100 parts of weight of a phyllosilicate. It has enhanced weatherability due to incorporation of phyllosilicate, and has further enhanced weatherability because the bleeding of an ultraviolet absorber and a light stabilizer is inhibited.

7 Claims, 1 Drawing Sheet

EXCHANGEABLE CATION (NA⁺ ETC.)

○: OXYGEN   ◯: HYDROXYL GROUP

●: ALUMINUM, IRON, MAGNESIUM ETC.

• AND ●: SILICON, ALUMINUM ETC.

US 7,135,518 B2

CURABLE COMPOSITIONS, SEALING MATERIAL, AND ADHESIVE

TECHNICAL FIELD

The present invention relates to a curable composition which reacts to be cured, in particular, a curable composition which gives a cured article excellent in weatherability and flame retardancy, and a sealing material and an adhesive using the curable composition.

BACKGROUND ART

A sealing material composition which comprises, as a base, an organic polymer having a reactive silyl group and is excellent in weatherability is disclosed in Japanese Patent Application Laid-Open (JP-A) No. 5-287186. In the sealing material composition described in this prior art, 0.3 to 3 parts by weight of each of a benzotriazole type ultraviolet absorber and a hindered phenol type antioxidant are blended per 100 parts by weight of an organic polymer having a reactive silyl group.

However, about the weatherability obtained by curing the sealing material composition, the limit value thereof is about 2,000 hours as a value measured with a sunshine weatherometer. Accordingly, in the case that the sealing material is used in outdoor-exposed portions, such as roof structures or outer wall structures, a sufficient weatherability cannot be obtained.

With a rise in the performance of housing, flame retardancy is more intensely desired in sealing materials, for example, sealing materials used in joints of outer walls. In the case that a halogen type flame retardant which is ordinarily used is incorporated into a sealing material, the flame retardancy thereof is enhanced but contamination may be generated by the bleeding-out of the flame retardant or harmful gas may be generated when a fire breaks out.

There is known a method of incorporating, into a sealing material, a compound containing crystal water in the molecular structure thereof, such as magnesium hydroxide, as a flame retardant. However, the incorporated amount thereof is restrictive from the viewpoint of workability. Accordingly, a sufficient flame retardancy cannot be exhibited.

Hitherto, about curable compositions used in sealing materials or the like, a curable composition having a sufficient adhesiveness to an adhesion-undergoing article which cannot be easily adhered, such as a vinyl chloride steel plate or a fluorine-containing resin steel plate, has been intensely desired.

DISCLOSURE OF THE INVENTION

In light of the present situation of the prior art as described above, an object of the present invention is to provide a curable composition which is capable of giving a cured article excellent in weatherability and flame retardancy, and a sealing material and an adhesive using the curable composition.

Another object of the present invention is to provide a curable composition which is capable of giving a cured article excellent in weatherability and flame retardancy and exhibits a sufficient adhesiveness to an adhesion-undergoing article which cannot be easily adhered, such as a vinyl chloride resin coated steel plate or a fluorine-containing resin steel plate, and a sealing material and an adhesive using the curable composition.

A first invention in the present application is a curable composition comprising an organic polymer having at least one crosslinkable hydrolyzable silyl group, and a phyllosilicate.

Preferably, 0.1 to 100 parts by weight of the phyllosilicate are blended per 100 parts of the organic polymer having the one or more crosslinkable hydrolyzable silyl group.

A specific aspect of the first invention further comprises at least one resin selected from the group consisting of a urethane resin, an epoxy resin and a modified polysulfide resin, wherein 0.1 to 100 parts by weight of the phyllosilicate are blended per 100 parts by weight of the total of the resin(s) and the organic polymer.

In a different specific aspect of the first invention, the main chain of the organic polymer is essentially made of a vinyl polymer and/or a polyether polymer.

The first invention may comprise, as the organic polymer, both of an organic polymer (a) wherein its main chain is essentially made of a polyether polymer and an organic polymer (b) wherein its main chain is essentially made of a vinyl polymer.

In a more restricted aspect of the first invention, the vinyl polymer is a (meth)acrylic acid ester polymer.

In a different restricted aspect of the first invention, the polyether polymer is polyoxypropylene polymer.

The above-mentioned hydrolyzable silyl group preferably has a structure represented by the following general formula (1):

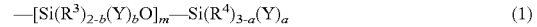

$$—[Si(R^3)_{2-b}(Y)_b O]_m—Si(R^4)_{3-a}(Y)_a \qquad (1)$$

wherein $R^3$ and $R^4$ each represent an alkyl group having 1 to 20 carbon atoms, an aryl group having 6 to 20 carbon atoms, an aralkyl group having 7 to 20 carbon atoms, or a triorganosiloxy group represented by (R')$_3$Si-(wherein R's are monovalent hydrocarbon groups having 1 to 20 carbon atoms, and three R's may be the same or different); when the number of $R^3$s or $R^4$s is two or more, they may be the same or different; Y represents a hydroxyl group or a hydrolyzable group; when the number of Ys is two or more, they may be the same or different; a represents 0, 1, 2 or 3; b is 0, 1 or 2; and m is an integer of 0 to 19 provided that $a+mb \geq 1$.

A second invention in the present application is a curable composition comprising 100 parts by weight of at least one resin selected from the group consisting of a urethane resin, an epoxy resin and a modified polysulfide resin; and 0.1 to 100 parts by weight of phyllosilicate.

Preferably, the first or second invention further comprises a light stabilizer, wherein 0.1 to 20 parts by weight of the light stabilizer are blended per 100 parts by weight of the organic polymer when none of the resin(s) is/are contained, per 100 parts by weight of the resin(s) when the organic polymer is not contained or per 100 parts by weight of the total of the resin(s) and the organic polymer when both of them are contained.

As the light stabilizer, a hindered amine light stabilizer is preferably used.

Preferably, the first or second invention further comprises an ultraviolet absorber, wherein 0.1 to 20 parts by weight of the ultraviolet absorber are blended per 100 parts by weight of the organic polymer when none of the resin(s) is/are contained, per 100 parts by weight of the resin(s) when the organic polymer is not contained or per 100 parts by weight of the total of the resin(s) and the organic polymer when both of them are contained.

The phyllosilicate used in the invention is preferably phyllosilicate wherein the average interlayer distance between (001) planes on the basis of wide-angle X-ray diffractometry is 3 nm or more.

The phyllosilicate is not particularly limited, and montmorillonite or swellable mica is preferably used.

The phyllosilicate is preferably treated with a quaternary ammonium salt.

In a specific aspect of the present invention, the phyllosilicate is treated with an alkylammonium ion having an alkyl chain having 6 or more carbon atoms or a polyoxyalkylene chain.

In a different specific aspect of the curable composition according to the present invention, about a burning residue obtained by heating a cured article of the curable composition under a radiation heating condition of 50 kW/m$^2$ for 30 minutes (according to ASTM E 1354), the yield stress obtained when the residue is compressed at 0.1 cm/second is 4.9 kPa or more.

A different specific aspect of the curable composition according to the present invention further comprises a non-halogen type flame retardant, wherein 0.5 to 100 parts by weight of the non-halogen type flame retardant are blended per 100 parts by weight of the organic polymer when none of the resin(s) is/are contained, per 100 parts by weight of the resin(s) when the organic polymer is not contained or per 100 parts by weight of the total of the resin(s) and the organic polymer when both of them are contained.

A different specific aspect of the curable composition according to the present invention further comprises a reactive diluting agent having a viscosity of 10 to 5000 cps at 25° C.

A different specific aspect of the curable composition according to the present invention further comprises at least one compound selected from the group consisting of an amine compound, an amide compound, and a fatty acid ester which each have a melting point of 40 to 75° C.

A different specific aspect of the curable composition according to the present invention further comprises a silane compound which contains an epoxy group, and a ketimine compound.

A different specific aspect of the curable composition according to the present invention further comprises an incorporated epoxy compound.

A different specific aspect of the curable composition according to the present invention further comprises a silane compound which contains an epoxy group, and a diamine compound.

A different specific aspect of the curable composition according to the present invention further comprises a tetravalent organic tin compound having at least an alkyl group having 8 or more carbon atoms and/or a thioether group.

A different specific aspect of the curable composition according to the present invention further comprises calcium carbonate having a particle size of 0.5 to 2 μm, wherein 30 to 200 parts by weight of the calcium carbonate are blended per 100 parts by weight of the organic polymer when none of the resin(s) is/are contained, per 100 parts by weight of the resin(s) when the organic polymer is not contained, or per 100 parts by weight of the total of the resin(s) and the organic polymer when both of them are contained.

The curable composition according to any one of claims 1 to 24.

In a different specific aspect of the curable composition according to the present invention, the organic polymer having the one or more crosslinkable hydrolyzable silyl groups is a polymer obtained by polymerizing a monomer composition containing at least a (meth)acrylic acid ester having at least an alkoxysilyl group by a free-radical polymerization method using a peroxide as a polymerization initiator.

A different specific aspect of the curable composition according to the present invention further comprises an electrically conducting agent, thereby making it possible to supply an electrically conductive sealing material, an electrically conductive adhesive, or the like.

The sealing material according to the present invention comprises the curable composition constructed according to the present invention.

The adhesive according to the present invention comprises the curable composition of the present invention.

Details of the present invention are described hereinafter.

The organic polymer used in the present invention has at least one hydrolyzable silyl group which can form a siloxane bond so as to be crosslinked, and this siloxane bond is made from, for example, a hydroxyl group or hydrolyzable group bonded to a silicon atom.

Preferable examples of the hydrolyzable group, which is bonded to a silicon atom, include hydrogen and halogen atoms, alkoxy groups such as methoxy and ethoxy groups, acyloxide groups, ketoxymate groups, amino groups, amide groups, acid amide groups, aminooxy groups, mercapto groups, alkenyloxide groups, and the like.

As the hydrolyzable silyl group, an alkoxysilyl group such as a methoxysilyl or ethoxysilyl group is preferably used since harmful byproducts are not produced after the group reacts.

The main chain of the silicon-containing group which can form the above-mentioned siloxane group so as to be crosslinked, that is, the organic polymer having at least one crosslinkable hydrolyzable silyl group is not particularly limited, and examples thereof include polyether polymers, vinyl polymers, polyester polymers, polycarbonate polymers, polyolefin polymers, and the like. The main chain is preferably made of a polyether polymer and/or a vinyl polymer. In other words, the main chain may have both of a polyether polymer moiety and a vinyl polymer moiety.

The following describes an organic polymer (a) wherein its main chain is essentially made of a polyether polymer and an organic polymer (b) wherein its main chain is essentially made of a vinyl polymer.

(Organic Polymer (a) Wherein its Main Chain is Made of a Polyether Polymer)

Examples of the main chain structure of the organic polymer (a) having a hydrolyzable silyl group, wherein its main chain is essentially made of a polyether polymer, include polyoxyethylene polymer, polyoxypropylene polymer, and polyoxybutylene polymer.

Polyoxypropylene polymer is particularly preferable since the cured article of the curable composition has a good water resistance and when the composition is used as a sealing material, a higher elasticity can be ensured.

If the molecular weight of the organic polymer (a) is too small, the elongation of the cured article becomes insufficient and when the composition is used as a sealing material, for example, the property that the composition follows joint faces may lower. Conversely, if the molecular weight is too large, the viscosity of the composition before being cured becomes too high so that the workability of the blending step of preparing the sealing material by blending various additives may lower.

For this reason, the organic polymer (a) wherein the number-average molecular weight is preferably from 10000 to 30,000 and the molecular weight distribution Mw/Mn (the weight-average molecular weight/the number-average molecular weight) is 1.6 or less is preferable since the balance between workability and elongation of the cured article is excellent.

The organic polymer (a) is generally called modified silicone polymer, and, for example, the following are commercially available: MS polymers S-203, S-303 and others as a trade made "MS Polymer" (manufactured by Kaneka Corp.); Silyls SAT-200, SAT-350 and SAT-400 as a trade name "Silyl Polymer" (manufactured by Kaneka Corp.); Excestars ESS-3620, ESS-3430, ESS-2420, ESS-2410 and others as a trade name "Excestar" (manufactured by Asahi Glass Co., Ltd.)

(Organic Polymer (b) Wherein its Main Chain is Made of a Vinyl Polymer)

The organic polymer (b) having a hydrolyzable silyl group, wherein its main chain is essentially made of a vinyl polymer, is obtained by copolymerizing, for example, a vinyl monomer and a hydrolyzable silyl group containing monomer. The polymer may comprise, as a part of the main chain or chains, a unit made of a urethane bond or a siloxane bond in a range of 50% or less in the whole.

The molecular weight of the organic polymer (b) is not particularly limited. The organic polymer (b) wherein the number-average molecular weight is preferably from 5,000 to 200,000, more preferably from 10,000 to 60,000 and the molecular weight distribution Mw/Mn is 1.6 or less is preferable since the balance between workability and elongation of the cured article is excellent.

The organic polymer (b) used in the present invention can be obtained by, for example, methods described below.

(1) A method of causing a (meth)acrylic group ester copolymer having an allyl group to react with a hydrosilicon compound represented by the following general formula (2) in the presence of a Group VIII transition metal, as described in JP-A No. 54-36395:

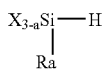

Formula (2)

wherein R represents a group selected from monovalent hydrocarbon groups and halogenated monovalent hydrocarbon groups, a represents 0, 1 or 2, and X represents a group or an atom selected from halogen atoms, alkoxy groups, acyloxy groups, and ketoximate groups.

(2) A method of copolymerizing a vinyl monomer in the presence of an alkyl (meth)acrylate containing an alkoxysilyl group and a chain transfer agent containing a mercapto group, as described in JP-A No. 57-179210.

(3) A method of copolymerizing a vinyl monomer in the presence of a bifunctional radical polymerizable compound and a mercaptan containing an alkoxysilyl group as a chain transfer agent, as described in JP-A No. 59-78222.

(4) A method of polymerizing a vinyl monomer by use of azobisnitrile compound containing an alkoxysilyl group as a polymerization initiator, as described in JP-A No. 60-23405.

(5) A method of producing a vinyl polymer by a living radical polymerization method, as described in JP-A No. 11-130931.

The vinyl monomer used when the organic polymer (b) is produced is not particularly limited. Specific examples thereof include methyl(meth)acrylate, ethyl(meth)acrylate, propyl(meth)acrylate, n-butyl(meth)acrylate, tert-butyl (meth)acrylate, cyclohexyl(meth)acrylate, 2-ethylhexyl (meth)acrylate, n-octyl(meth)acrylate, isooctyl(meth)acrylate, isononyl(meth)acrylate, isomyristyl(meth)acrylate, stearyl(meth)acrylate, isobornyl(meth)acrylate, benzyl (meth)acrylate, 2-butoxyethyl(meth)acrylate, 2-phenoxyethyl(meth)acrylate, glycidyl(meth)acrylate, tetrahydrofurfuryl(meth)acrylate, hexanediol di(meth)acrylate, ethylene glycol di(meth)acrylate, polyethylene glycol di(meth)acrylate, propylene glycol di(meth)acrylate, polypropylene glycol di(meth)acrylate, neopentyl glycol di(meth)acrylate, trimethylolpropane tri(meth)acrylate, pentaerythritol di(meth) acrylate, pentaerthritol tri(meth)acrylate, pentaerythritol tetra(meth)acrylate, dipentaerythritol hexa(meth)acrylate, epoxy acrylate, polyester acrylate, urethane acrylate, 2-hydroxyethyl(meth)acrylate, 3-hydroxypropyl(meth)acrylate, 2-hydroxypropyl(meth)acrylate, 4-hydroxybutyl(meth)acrylate, 2-hydroxybutyl(meth)acrylate, 5-hydroxylpentyl(meth) acrylate, 6-hydroxyhexyl (meth)acrylate, 3-hydroxy-3-methylbutyl(meth)acrylate, 2-hydroxy-3-phenoxypropyl(meth) acrylate, pentaerythritol tri(meth)acrylate, 2-[(meth) acryloyloxy]ethyl 2-hydroxyethylphthalate, 2-[(meth) acryloyloxy]ethyl 2-hydroxypropylphthalate, methyldimethoxypropyl(meth)acrylate,

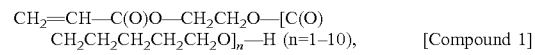

[Compound 1]

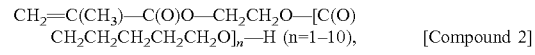

[Compound 2]

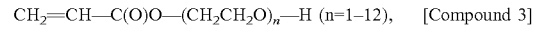

[Compound 3]

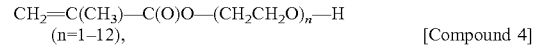

[Compound 4]

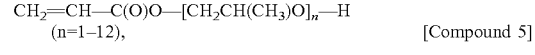

[Compound 5]

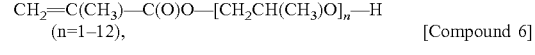

[Compound 6]

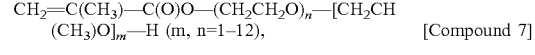

[Compound 7]

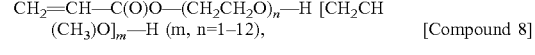

[Compound 8]

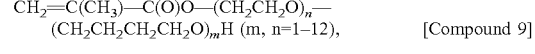

[Compound 9]

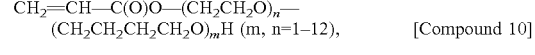

[Compound 10]

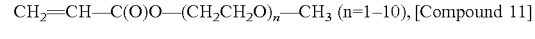

[Compound 11]

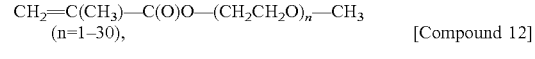

[Compound 12]

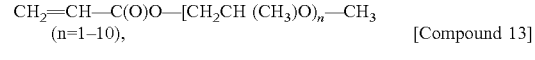

[Compound 13]

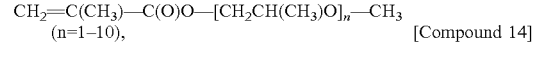

[Compound 14]

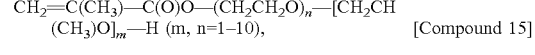

[Compound 15]

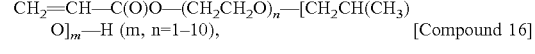

[Compound 16]

$CH_2=CH-C(O)O-[CH_2CH(CH_3)O]_n-C(O)-CH=CH_2$ (n=1–20), [Compound 17]

$CH_2=C(CH_3)-C(O)O-[CH_2CH(CH_3)O]_n-C(O)-C(CH_3)=CH_2$ (n=1–20), [Compound 18]

$CH_2=CH-C(O)O-(CH_2CH_2O)_n-C(O)-CH=CH_2$ (n=1–20) [Compound 19]

$CH_2=C(CH_3)-C(O)O-(CH_2CH_2O)_n-C(O)-C(CH_3)=CH_2$ (n=1–20), [Compound 20]

styrene and styrene derivatives such as indene, α-methylstyrene, p-methylstyrene, p-chlorostyrene, p-chloromethylstyrene, p-methoxystyrene, p-tert-butoxystyrene, and divinylbenzene; maleic anhydride, N-vinylpyrrolidone, N-vinylmorpholine, (meth)acrylonitrile, (meth)acrylamide, N-cyclohexylmaleimide, N-phenylmaleimide, N-laurylmaleimide, N-benzylmaleimide, compounds having a vinyl ester group, such as vinyl acetate, vinyl propionate, vinyl butyrate, vinyl caproate, vinyl benzoate, and vinyl cinnamate; compounds having a vinyloxy group such as n-propyl vinyl ether, n-butyl vinyl ether, isobutyl vinyl ether, tert-butyl vinyl ether, tert-amyl vinyl ether, cyclohexyl vinyl ether, 2-ethylhexyl vinyl ether, dodecyl vinyl ether, octadecyl vinyl ether, 2-chloroethyl vinyl ether, ethylene glycol butyl vinyl ether, trithylene glycol methyl vinyl ether, (4-vinyloxy)butyl benzoate, ethylene glycol divinyl ether, diethylene glycol divinyl ether, triethylene glycol divinyl ether, tetraethylene glycol divinyl ether, butane-1,4-diol-divinyl ether, hexane-1,6-diol-divinyl ether, cychexane-1,4-dimethanol-divinyl ether, di(4-vinyloxy)butyl isophthalate, di(4-vinyloxy)butyl glutarate, di(4-vinyloxy)butyl succinate trimethylolpropane trivinyl ether, 2-hydroxyethyl vinyl ether, 4-hydroxybutyl vinyl ether, 6-hydroxyhexyl, vinyl ether, cyclohexane-1,4-dimethanol-monovinyl ether, diethylene glycol monovinyl ether 3-aminopropyl vinyl ether, 2-(N,N-diethylamino)ethyl vinyl ether, urethane vinyl ether, and polyester vinyl ether.

Specific examples of commercially available products thereof include an Aronics M-5700, which is a vinyl monomer, manufactured by Toagosei Co., Ltd.; an AS-6, an AN-6, an AA-6, an AB-6, and an AK-5, which are macro-monomers, manufactured by Toagosei Co., Ltd.; a Placcel FA-1, a Placcel FM-1, and a Placcel FM-4, manufactured by Daicel Chemical Industries, Ltd, and the like.

Of these polymers, preferable is a (meth)acrylate copolymer wherein its main chain is composed of acrylic acid and an alkyl (meth)acrylate having a $C_{1-12}$ alkyl group, from the viewpoint of the flexibility thereof. More preferable is a copolymer made from acrylic acid and an alkyl (meth) acrylate having a $C_{2-8}$ alkyl group. The crosslinkable hydrolyzable silyl group is preferably an alkoxysilyl group such as a methoxysilyl group or an ethoxysilyl group since the group does not generate any harmful byproduct after the group reacts.

It is preferable to use, as the organic polymer (b), a polymer (b1) obtained by polymerizing a monomer composition containing a (meth)acrylic acid ester having an alkoxysilyl group by a free radical polymerization method using a peroxide as a polymerization initiator since the resultant polymer does not yellow easily after the polymer is used for a long time. In this case, as the alkoxysilyl group-containing (meth)acrylic acid ester monomers contained in the above-mentioned monomer composition, the above-mentioned various (meth)acrylic acid ester monomers can be used.

As the monomer used when the (meth)acrylic acid ester polymer is obtained, a copolymerizable monomer described below may be used together with the above-mentioned (meth)acrylic acid ester monomer so as to be copolymerized. Examples of such a copolymerizable monomer include styrene and styrene derivatives such as indene, α-methylstyrene, p-methylstyrene, p-chlorostyrene, p-chloromethylstyrene, p-methoxystyrene, p-tert-butoxystyrene, and divinylbenzene; maleic anhydride, N-vinylpyrrolidone, N-vinylmorpholine, (meth)acrylonitrile, (meth)acrylamide, N-cyclohexylmaleimide, N-phenylmaleimide, N-laurylmaleimide, N-benzylmaleimide, compounds having a vinyl ester, such as vinyl acetate, vinyl propionate, vinyl butyrate, vinyl caproate, vinyl benzoate, and vinyl cinnamate; compounds having a vinyloxy group such as n-propyl vinyl ether, n-butyl vinyl ether, isobutyl vinyl ether, tert-butyl vinyl ether, tert-amyl vinyl ether, cyclohexyl vinyl ether, 2-ethylhexyl vinyl ether, dodecyl vinyl ether, octadecyl vinyl ether, 2-chloroethyl vinyl ether, ethylene glycol butyl vinyl ether, triethylene glycol methyl vinyl ether, (4-vinyloxy)butyl benzoate, ethylene glycol divinyl ether, diethylene glycol divinyl ether, triethylene glycol divinyl ether, tetraethylene glycol divinyl ether, butane-1,4-diol-divinyl ether, hexane-1,6-diol-divinyl ether, cychexane-1,4-dimethanol-divinyl ether, di(4-vinyloxy)butyl isophthalate, di(4-vinyloxy)butyl glutarate, di(4-vinyloxy)butyl succinate trimethylolpropane trivinyl ether, 2-hydroxyethyl vinyl ether, 4-hydroxybutyl vinyl ether, 6-hydroxyhexyl, vinyl ether, cyclohexane-1,4-dimethanol-monovinyl ether, diethylene glycol monovinyl ether 3-aminopropyl vinyl ether, 2-(N,N-diethylamino)ethyl vinyl ether, urethane vinyl ether, and polyester vinyl ether.

In the case that the polymer (b1), which is obtained by a free radical polymerization method using a peroxide as a polymerization initiator, is a copolymer, the blend amount of the alkoxysilyl group-containing (meth)acrylic acid ester monomer is preferably from 0.01 to 20 parts, more preferably from 0.1 to 5 parts by weight per 100 parts by weight of the above-mentioned copolymerizable monomer.

The above-mentioned (meth)acrylic acid ester polymer (b1) can be obtained by a free radical polymerization method using a peroxide as a polymerization initiator. As the peroxide as the polymerization initiator, compounds described below can be used. The peroxide may be used alone or in combination. The peroxide may be successively added. Examples of such a peroxide include diacyl peroxides such as benzoyl peroxide, isobutyryl peroxide, isononanoyl peroxide, decanoyl peroxide, lauroyl peroxide, p-chlorobenzyol peroxide, and di(3,5,5-trimethylhexanoyl) peroxide; peroxydicarbonates such as diisopropyl perdicarbonate, di-sec-butyl perdicarbonate, di-2-ethylhexyl perdicarbonate, di-1-methylbutyl perdicarbonate, di-3-methoxybutyl perdicarbonate, and dicyclohexyl perdicarbonate; peroxyesters such as tert-butyl perbenzoate, tert-butyl peracetate, tert-butyl per-2-ethylhexanoate, tert-butyl perisobutyrate, tert-butyl perpivalate, tert-butyl diperadipate, and cumyl perneodecanoate; ketone peroxides such as methyl ethyl ketone peroxide, and cyclohexanone peroxide; dialkylperoxides such as di-tert-butylperoxide, dicumylperoxide, tert-butylcumylperoxide, and 1,1-di(t-hexylperoxy)-3,3,5-trimethylcyclohexanone; hydroperoxides such as cumenehydroxyperoxide, tert-butylhydroperoxide.

(Use of the Organic Polymer (a) and the Organic Polymer (b) Together)

The organic polymer (a) having at least one crosslinkable hydrolyzable silyl group, wherein its main chain is essentially made of a polyether polymer, and the organic polymer (b) having at least one crosslinkable hydrolyzable silyl group, wherein its main chain is essentially made of a vinyl polymer, may be used together in the present invention. The use of the organic polymer (a) and the organic polymer (b) together makes it possible to enhance the water resistance of the cured article of the curable composition and the rubber elasticity when the composition constitutes a sealing material.

In the case that the organic polymer (a) and the organic polymer (b) are used together, the blend ratio therebetween is as follows: the amount of the organic polymer (a) is preferably from 0.1 to 200 parts, more preferably from 0.5 to 100 parts by weight per 100 parts by weight of the organic polymer (b).

If the blend ratio of the organic polymer (a) is less than 0.1 part by weight, the effect of improving adhesiveness may become small. If it is more than 200 parts by weight, the weatherability may lower and the adhesiveness-improving effect does not get very high.

(Method for Introducing the Hydrolyzable Silyl Group)

In the present invention, the above-mentioned hydrolyzable silyl group is a functional group wherein 1 to 3 alkoxy groups are bonded to a silicon atom. Examples of the alkoxy group include methoxy, ethoxy, propyloxy, isopropyloxy, butoxy, tert-butoxy, phenoxy, benzyloxy groups, and the like. Examples of an alkoxysilyl group, to which an alkoxy group is bonded, include trialkoxysilyl groups such as trimethoxysilyl, triethoxysilyl, triisopropoxysilyl, and triphenoxysilyl groups; dimethoxysilyl groups such as dimethoxymethylsilyl and diethoxymethylsilyl groups; and monoalkoxysilyl groups such as methoxydimethoxysilyl and ethoxydimethylsilyl groups. Plural groups of any one kind of these alkoxy groups may be used in combination, or plural groups of different kinds thereof may be used in combination.

The hydrolyzable silyl group in the organic polymers (a) and (b) in the present invention is not particularly limited, and a group represented by the following general formula (1) is preferably used:

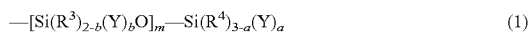

wherein $R^3$ and $R^4$ each represent an alkyl group having 1 to 20 carbon atoms, an aryl group having 6 to 20 carbon atoms, an aralkyl group having 7 to 20 carbon atoms, or a triorganosiloxy group represented by $(R')_3Si-$ (wherein R's are monovalent hydrocarbon groups having 1 to 20 carbon atoms, and three R's may be the same or different); when the number of $R^3$s or $R^4$s is two or more, they may be the same or different; Y represents a hydroxyl group or a hydrolyzable group; when the number of Ys is two or more, they may be the same or different; a represents 0, 1, 2 or 3; b is 0, 1 or 2; and m is an integer of 0 to 19 provided that $a+mb \geq 1$.

Examples of the method for introducing the hydrolyzable silyl group include a method of starting polymerization with an initiator having the hydrolyzable silyl group; a method of using a chain transfer agent having the hydrolyzable silyl group; and a method of performing polymerization in a manner using a copolymerizable monomer having the hydrolyzable silyl group and introduction of the silyl group at the same time. The silyl group can be introduced while the (meth)acrylic monomer is polymerized with an initiator.

More specifically, the vinyl polymer having at its terminal the crosslinkable silyl group of the general formula (1) can be obtained by the following step ① and ②:

① A vinyl monomer is radical-polymerized by use of an organic halogenated compound or a halogenated sulfonyl compound as an initiator and a transition metal complex as a catalyst, thereby producing a vinyl polymer having a terminal structure represented by the following general formula (3):

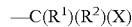 Formula (3)

wherein $R^1$ and $R^2$ represent groups bonded to the vinyl group in the vinyl monomer, and X represents chlorine, bromine or iodine.

② The halogen of the general formula (3) is converted to a silyl group-containing substituent represented by the general formula (1), thereby yielding the polymer.

As the method for producing the vinyl polymer having the terminal structure represented by the general formula (3), an atom-transferring type radical polymerization described in JP-A No. 11-80571 is preferably used.

Examples of the chain transfer agent or the copolymerizable monomer for introducing the hydrolyzable silyl group include alkoxysilanes having a functional group having a high chain transfer ability, such as mercaptomethyltrimethylsilane, 3-mercaptopropyltrimethoxysilane, and 3-mercaptopropyldimethoxymethylsilane; alkoxysilanes having a polymerizable unsaturated group, such as N-(3-acryloyloxy-2-hydroxypropyl)-3-aminopropyltriethoxysilane, 3-acryloyloxypropyldimethylmethoxysilane, 3-acryloyloxypropylmethyldimethoxysilane, 3-acryloyloxypropyltrimethoxysilane, 3-acryloyloxypropylmethylbis(trimethylsiloxy)silane, allyltriethoxysilane, allyltrimethoxysilane, 3-allylaminopropyltrimethoxysilane, 3-methacryloyloxypropyldimethylmethoxysilane, 3-methacryloyloxypropyldimethylethoxysilane, 3-methacryloyloxypropylmethyldimethoxysilane, 3-methacryloyloxypropylmethyldiethoxysilane, 3-methacryloyloxypropyltrimethoxysilane, 3-methacryloyloxypropenyltrimethoxysilane, vinylmethyldiacetoxysilane, vinyltriacetoxysilane, vinyldimethylmethoxysilane, vinyldimethylethoxysilne, vinylmethyldiethoxysilane, vinyltrimethoxysilane, vinyltriethoxysilane, vinyltriisopropoxysilane, vinyltriphenoxysilane, vinyldimethylisopentenyloxysilane, vinyldimethyl-2-((2-ethoxyethoxy)ethoxy)silane, vinyltris(1-methylvinyloxy)silane, vinyltris(2-methoxyethoxy)silane, phenylvinyldiethoxysilane, diphenylvinylethoxysilane, 6-triethoxysilyl-2-norbornene, octa-7-enyltrimethoxysilane, and styrylethyltrimethoxysilane, and the like.

(Urethane Resin, Epoxy Resin and Modified Polysulfide Resin)

The first invention may comprise at least one resin selected from the group consisting of a urethane resin, an epoxy resin and a modified polysulfide resin in addition to the above-mentioned organic polymer. Further addition of the urethane resin makes it possible that when the curable composition of the first invention is cured, the elastic modulus thereof can be made high. Addition of the epoxy resin makes it possible to improve the adhesion endurance of the curable composition of the first invention. Addition of the modified polysulfide resin makes it possible to make the contamination resistance of the cured article high.

When the urethane resin, epoxy resin and modified polysulfide resin are added, they are desirably incorporated in such a manner that the total amount of the urethane resin, epoxy resin and/or modified polysulfide resin is from 1 to 100 parts by weight per 100 parts by weight of the organic polymer. If the amount is less than 1 part by weight, the effect of the addition of these resins is insufficient. If the amount is more than 100 parts by weight, bad effect may be produced on the dynamic physical properties and others.

As the urethane resin used in the present invention, there is used an ordinary urethane resin obtained by reaction of a polyisocyanate having at least two isocyanate groups with a polyol.

Examples of the polyisocyanate include various polyisocyanate compounds which are generally used for the production of urethane resins. Specific examples thereof include 2,4-tolylene diisocyanate, phenylene diisocyanate, xylene diisocyanate, diphenylmethane diisocyanate (MDI), 1,5-naphthylene diisocyanate, hydrogenated products thereof, a mixture of MDI and triphenylmethane triisocyanate etc. (crude MDI), isophorone diisocyanate, dicyclohexylmethane diisocyanate, ethylene diisocyanate, methylene diisocyanate, propylene diisocyanate, tetramethylene diisocyanate, and the like. These may be used alone or in combination of two or more thereof. MDI and crude MDI are desirable since they are excellent in safety and reactivity.

Examples of the above-mentioned polyol include various polyether type polyols, polyester type polyols polymer polyols, and the like which are generally used for the production of urethane resins.

Examples of the polyether type polyols include polyether polyols obtained by ring-opening polymerization of one or more alkylene oxides such as propylene oxide, ethylene oxide and tetrahydrofuran in the presence of one or more low molecular weight active-hydrogen compounds having two or more active hydrogens (for example, diols such as bisphenol A, ethylene glycol, propylene glycol, butylene glycol, and 1,6-hexanediol; triols such as glycerin, and trimethylolpropane; amines such as ethylenediamine and butylenediamine.

Examples of the above-mentioned polyester type polyols include polymers obtained by dehydration condensation of a polybasic acid (such as adipic acid, azelaic acid, sebacic acid, terephthalic acid, isophthalic acid, or succinic acid) and a polyhydric alcohol (such as bisphenol A, ethylene glycol, 1,2-propylene glycol, 1,4-butanediol, diethylene glycol, 1,6-hexane glycol, or neopentyl glycol), polymers of a lactone (such as ε-caprolactone, or α-methyl-ε-caprolactone), condensates of a hydroxycarboxylic acid and the above-mentioned polyhydric alcohol or the like (such as castor oil, or a reaction product of castor oil and ethylene glycol).

Examples of the polymer polyol include polyols wherein an ethylenic unsaturated compound such as acrylonitrile, styrene, or methyl (meth)acrylate is graft-polymerized onto the above-mentioned polyether type polyol or polyester type polyol, 1,2- or 1,4-polybutadiene polyol, or hydrogenated products thereof. One or more out of these polyols may be used.

The weight-average molecular weight of these polyols is preferably from about 100 to 50,000, more preferably from about 500 to 5,000.

It is preferable to mix the above-mentioned polyisocyanate and polyol in such a manner that the ratio by equivalent of the active hydrogen group (OH) in the polyol to the active isocyanate (NCO) in the polyisocyanate (NCO/OH) is from 1.2 to 15, preferably from 3 to 12, and then causing them to react with each other at 80 to 100° C. in nitrogen gas flow for 3 to 5 hours, thereby yielding the above-mentioned polyurethane resin. If the ratio by equivalent is 1.2 or less, the viscosity of the urethane resin may be too high. If the ratio is more than 15, the cohesive force of the cured article may lower by curing and foaming, so as not to yield a necessary bonding strength.

It is preferable to use an amine type catalyst for the curable composition in which the above-mentioned urethane resin is incorporated, to promote humidly-curing reaction thereof. Specific examples of the amine type catalyst include triethylamine, N-methylmorpholinebis(2-dimethylaminoethyl)ether, N,N,N',N",N"-pentamethyldiethylenetriamine, N,N,N'-trimethylaminoethyl-ethanolamine, bis(2-dimethylaminoethyl)ether, N-methyl, N'-dimethylaminoethylpiperazine, imidazole compounds wherein the secondary amine functional group in their imidazole ring is substituted with a cyanoethyl group, and the like. One or more out of these may be used.

As the epoxy resin used in the present invention, an epoxy resin which is usually used and is cured with an epoxy curing agent can be used. Examples thereof include bisphenol A type epoxy resin, bisphenol AD type epoxy resin, bisphenol S type epoxy resin, phenol novolak type epoxy resin, 3,4-epoxycyclohexylmethyl-3,4-epoxycyclohexane carboxylate, diglycidyl ether of 1,4-butanediol, diglycidyl phthalate, and triglycidyl isocyanurate.

The epoxy curing agent is not particularly limited. Various curing agents for epoxy resin which have been conventionally known can be used. Specific examples thereof include amine compounds, polyaminoamide compounds synthesized from amine compounds, hydrazide compounds, dicyandiamide and derivatives thereof, melamine compounds, and the like.

Specific examples of the epoxy curing agent include chain-form aliphatic amines, such as ethylenediamine, diethylenetriamine and polyoxypropylenetriamine, and derivatives thereof, isophoronediamine, diaminodicyclohexylmethane, and the like. One or more out of these may be used.

The modified polysulfide resin used in the present invention is not particularly limited, and may be an ordinary modified polysulfide resin. Examples of the modified polysulfide resin include resins having, at one or two terminals of the molecule thereof, at least one crosslinkable mercapto group (—SH group) and having, in the main chain thereof, polyether bonds for the most part thereof. Examples of commercially available products thereof include a "Permapol P-500" a "Permapol P-965" manufactured by Nippon Shokubai Co., Ltd, and the like.

As a curing agent for the modified polysulfide resin, there can be used an agent which has been conventionally used as a curing catalyst for curing modified polysulfide resin. It is particularly preferable to use a mixture of equal amounts of ferric dimethyldithiocarbamate and zinc dibutylthiocarbamate.

The use of the above-mentioned modified polysulfide resin and organic polymer together makes the contamination resistance high.

(Resin in the Second Invention)

In the second invention in the present application, the above-mentioned organic polymer is not used. At least one resin is used which is selected from the group consisting of a urethane resin, an epoxy resin and a modified polysulfide resin. The urethane resin, the epoxy resin and the modified polysulfide resin are the same as those which are arbitrarily added in the first invention. Therefore, the description about these resins and the curing agent in the first invention is incorporated herein for reference.

(Phyllosilicate)

The phyllosilicate used in the invention means a silicate mineral having exchangeable cations between layers thereof. The phyllosilicate used in the invention is not particularly limited. Examples thereof include smectite type clay materials such as montmorillonite, saponite, hectorite, beidellite, stevensite and nontronite, vermiculite, halloysite, swellable mica, and the like. Particularly preferable are montmorillonite and swellable mica. The phyllosilicates may be natural products or synthetic products. One or more out of these may be used.

From the viewpoint of an improvement in the mechanical strength of the curable composition and an improvement in the gas barrier ability thereof, it is preferable to use, as the phyllosilicate, smectites or swellable mica, which has a large shape anisotropy effect defined as an equation described below. A crystal surface (A) of a phyllosilicate and a crystal end face (B) thereof are schematically shown in FIG. 1.

Shape anisotropy effect=the area of the crystal surface (A)/the area of the crystal end face (B)

As shown in FIG. 2, exchangeable cations present between layers of the phyllosilicate are ions of sodium, calcium and others on the surface of the crystal. Since these ions and cationic materials have ion exchangeability, various cationic materials can be captured (intercalated) between the layers of the phyllosilicate.

The cation exchangeable capacity of the phyllosilicate is not particularly limited, and is preferably from 50 to 200 milliequivalent/100 g. If the capacity is less than 50 milliequivalent/100 g, the amount of a cationic surfactant which can be captured (intercalated) between the crystal layers becomes small due to an ion exchange so that the spaces between the layers may not be sufficiently non-polarized. On the other hand, if the capacity is more than 200 milliequivalent/100 g, the binding power between the layers of the phyllosilicate becomes strong so that the distance between crystalline thin pieces which constitute the respective layers of the phyllosilicate may not be increased with ease.

The phyllosilicate is blended in an amount of 0.1 to 100 parts, more preferably from 0.5 to 50 parts, particularly preferably from 1 to 10 parts by weight per 100 parts by weight of the base resin. If the amount is less than 0.1 part by weight, an improvement in the weatherability of the cured article, flame retardancy and other effects are not easily expressed. If the amount is more than 100 parts by weight, the viscosity of the curable composition becomes high so that the usability or productivity thereof may lower.

The base resin is the above-mentioned organic polymer; or the organic polymer, and the urethane resin, epoxy resin and/or modified polysulfide resin which are added if necessary in the first invention. The base resin is the urethane resin, epoxy resin and/or modified polysulfide resin in the second invention.

The phyllosilicate is preferably a silicate wherein the average interlayer distance between (001) planes, measured by the basis of wide-angle X-ray diffractometry, is 3 nm or more, the silicate being dispersed to contain thin pieces present in the form of 5 or less layers. When the average interlayer distance is 3 nm or more and the silicate are dispersed in the form of 5 or less layers, the performances of the weatherability and the retardancy of the curable composition are favorably expressed.

In the present specification, the average interlayer distance of the phyllosilicate is the average interlayer distance obtained when the fine thin piece crystal thereof is made into layers, and can be calculated by X-ray diffraction peaks, that is, transmission electron microscopic photography. The state that the layers are cleaved to have a space of 3 nm or more and the silicate is dispersed to contain thin pieces present in the form of 5 or less layers means that a part or all of the laminate of the phyllosilicate is dispersed. This is based on weakened interaction between the layers.

If the average interlayer distance of the phyllosilicate is 6 nm or more, the expression of functions such as flame retardancy, mechanical property and heat resistance is particularly advantageous. If the average interlayer distance is 6 nm or more, the crystalline thin piece layers of the phyllosilicate are separated into independent layers. As a result, the interaction in the phyllosilicate becomes so weak that the interaction can be substantially ignored. Therefore, the dispersion state of the crystalline thin pieces, which constitute the phyllosilicate, in the resin goes toward exfoliation stabilization. That is, the phyllosilicate is present so as to be stabilized in the curable composition in the state that the phyllosilicate is separated into independent thin pieces.

As the state that the phyllosilicate is dispersed, the following is preferable: thin piece form crystal of the phyllosilicate is dispersed to a high degree in the base resin, that is, in the organic polymer, or in the mixture of the organic polymer and the urethane resin, epoxy resin and/or modified polysulfide resin which are added if necessary in the first invention, or in the urethane resin, epoxy resin and/or modified polysulfide resin in the second invention. More specifically, it is preferable that 10% or more by mass of the phyllosilicate is dispersed in the state that this silicate is present in the form of 5 or less layers. It is more preferable that 20% or more by mass of the phyllosilicate is present in the form of 5 or less layers. When the number of the laminated thin piece form crystals, which are dispersed, is 5 or less, the effect based on the addition of the phyllosilicate is satisfactorily obtained. More preferably, the number is 3 or less. Still more desirably, the phyllosilicate is dispersed into a monolayer form.

The phyllosilicate of the invention is preferably a phyllosilicate treated with a quaternary ammonium salt. This is because the treatment with the quaternary ammonium salt makes it possible to improve the dispersibility of the phyllosilicate in the base resin. It is known that the quaternary ammonium salt has a catalyst effect on crosslinking reaction of the organic polymer. The dispersion of the salt together with the phyllosilicate in the base resin makes it possible to improve the dispersibility and promote the curing speed.

Examples of the quaternary ammonium salt include lauryltrimethyl ammonium, stearyltrimethyl ammonium, trioctyl ammonium, distearyldimethyl ammonium, bis-hardened beef tallow dimethyl ammonium, distearyldibenzyl ammonium, N-polyoxyethylene-N-lauryl-N,N-dimethyl ammonium salts, and the like. These quaternary ammonium salts may be used alone or in combination of two or more thereof. Among the above, preferable is a quaternary alkyl ammonium ion salt having an alkyl chain having 6 or more carbon atoms or a polyoxyalkylene chain since good dispersibility can be obtained.

For the dispersion of the phyllosilicate, various stirrers may be used. In the case that the phyllosilicate is not easily dispersed, a desired dispersion state may be easily obtained if a machine for applying a high shear, such as a three-roll machine, is used to perform the dispersion.

(Amine Compound which Contains a Hydrolyzable Silyl Group)

It is permissible to incorporate, into the curable composition of the present invention, one or more amine compounds selected from primary amine compounds which contain a hydrolyzable silyl group and secondary amine compounds which contain a hydrolyzable silyl group.

Examples of the amine compounds include 3-aminopropyltrimethoxysilane, 3-aminopropyltriethoxysilane, 3-aminopropylmethyldimethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N,N-bis-[3-(trimethoxysilyl)propyl]amine, N,N-bis-[3-(triethoxysilyl)propyl]amine, N,N-bis-[3-(methyldimethoxysilyl)propyl]amine, 3-[N-allyl-N-(2-aminoethyl)]aminopropyltrimethoxysilane, p-[N-(2-aminoethyl)aminomethyl]phenethyltrimethoxysilane, N,N-bis-[3-(trimethoxysilyl)propyl]ethylenediamine, N,N-bis-[3-(methyldimethoxysilyl)propyl]ethylenediamine, N-[3-(trimethoxysilyl)propyl]diethylenetriamine, N-[3-(methyldimethoxysilyl)propyl]diethylenetriamine, N-[3-(trimethoxysilyl)propyl]triethylenetetramine, and N-[3-(methyldimethoxysilyl)propyl]triethylenetetramine, and the like. These may be used alone or in combination of two or more thereof.

The blend amount of the amine compound used in the present invention is preferably from 0.1 to 20 parts, more preferably from 0.5 to 10 parts by weight per 100 parts by weight of the base resin. If the blend amount is less than 0.1 part by mass, the effect of improving adhesiveness is small. Even if the amine compound is added in an amount over 20 parts by weight, the adhesiveness-improving effect does not get higher.

(Silane Compounds (X) and (Y))

In the case that the organic polymer having at least one crosslinkable hydrolyzable silyl group contains a vinyl polymer, or a vinyl polymer and the above-mentioned polyether polymer in the curable composition according to the present invention, it is permissible to incorporate, into the curable composition, a silane compound (X) having an amino group and having two alkoxy groups bonded to the silicon atom thereof, and a silane compound (Y) having a glycidyl group and having two alkoxy groups bonded to the silicon atom thereof.

The silane compound (X) used in the invention is a compound having an amino group and having two alkoxy groups bonded to the silicon atom thereof. Examples thereof include N-[(2-aminoethyl)aminopropyl]methyldimethoxysilane, N-[(3-methyldimethoxysilyl)propyl]diethylenetriamine, N-[(3-methyldimethoxysilyl)propyl]triethylenetetramine, 3-aminopropylmethyldimethoxysilane, 3-aminopropylmethyldimethoxysilane, and the like.

The number of the alkoxy groups bonded to the silicon atom in the silane compound (X) is two. If the number of the alkoxy groups is 1, sufficient adhesiveness cannot be obtained. If the number is 3 or more, the cured article hardens so that sufficient tensile property cannot be obtained.

If the amount of the silane compound (X) becomes small, sufficient adhesiveness cannot be easily obtained. If the amount becomes large, the hardening ability at room may lower. Therefore, the added amount of the silane compound (X) is preferably from 0.1 to 10 parts by weight, more preferably from 0.1 to 5 parts by weight per 100 parts by weight of the above-mentioned vinyl polymer or 100 parts by weight of the total of the vinyl polymer and the polyether polymer.

The silane compound (Y) is a compound having a glycidyl group and having two alkoxy groups bonded to the silicon atom thereof. Examples thereof include 3-glycidoxypropylmethyldimethoxysilane, 3-(N-allyl-N-glycidyl)aminopropylmethyldimethoxysilane, N-glycidyl-N,N-bis[3-methyldimethoxysilyl)propyl]amine, and the like.

The number of the alkoxy groups bonded to the silicon atom in the silane compound (Y) is two. If the number of the alkoxy groups is 1, sufficient adhesiveness cannot be obtained. If the number is 3 or more, the cured article hardens so that sufficient tensile property cannot be obtained.

If the amount of the silane compound (Y) becomes small, sufficient adhesiveness cannot be easily obtained. If the amount becomes large, the hardening ability may lower. Therefore, the added amount is preferably from 0.1 to 10 parts by weight, more preferably from 0.1 to 5 parts by weight per 100 parts by weight of the above-mentioned vinyl polymer or 100 parts by weight of the total of the vinyl polymer and the polyether polymer.

(Yield Stress)

About a burning residue obtained by heating the cured article of the curable composition of the invention under a radiation heating condition of 50 kW/m$^2$ for 30 minutes (according to ASTM E 1354), the yield stress obtained when the residue is compressed at 0.1 cm/second is preferably 4.9 kPa or more. If the yield stress is less than 4.9 kPa, shape-keeping ability cannot be obtained when a fire breaks out. Thus, when the curable composition of the invention is used for adhesion of tiles or the like, the supported articles may drop.

(Ultraviolet Absorbent, and Light Stabilizer)

It is preferable to incorporate, into the curable composition of the invention, various ultraviolet absorbers and/or light stabilizers in order to improve the weatherability. This is because the use thereof together with the phyllosilicate causes the phyllosilicate to act to suppress the bleeding-out of the various ultraviolet absorbers and/or light stabilizers, whereby these are kept in the cured article for a long term.

The ultraviolet absorbers may be known ultraviolet absorbers of a benzotriazole type, a benzophenone type and other types. The benzotriazole type ultraviolet absorbers are particularly preferable since the ultraviolet absorbing performance thereof is high. When the ultraviolet absorber is incorporated, the absorber is incorporated preferably in an amount of 0.1 to 20 parts, more preferably in an amount of 0.5 to 10 parts by weight per 100 parts by weight of the base resin made of the above-mentioned organic polymer, urethane resin, epoxy resin and/or modified polysulfide resin. If the amount is less than 0.1 part by weight, the weatherability-improving effect may be insufficient. If the amount is more than 20 parts by weight, problems such that the appearance as a sealing material is damaged by coloration are caused.

As the light stabilizer, for example, hindered amine light stabilizers are used. The hindered amine light stabilizers generally exhibit an excellent effect when they are used together with the ultraviolet absorber. Of the hindered amine light stabilizers (referred to as the light stabilizers hereinafter), a light stabilizer having in the molecule thereof a group having a structure represented by a general formula (4) described below produces a particularly remarkable effect when the stabilizer is used together with the phyllosilicate. Examples of such a hindered amine light stabilizer include bis(2,2,6,6-tetramethyl-4-piperidine)sebacate, poly[{6-(1,1,3,3-tetramethylbutyl)amino-1,3,5-triazine-2,4-diyl}{(2,2,6,6-tetramethyl-4-piperidine)imino}hexamethylene{(2,2,6,6-tetramethyl-4-piperidine)imino}], and the like. These may be used alone or in combination of two or more thereof.

Light Stabilizer

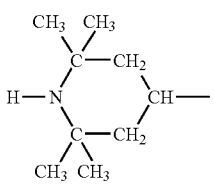

Formula (4)

It appears that the weatherability effect based on the use of the light stabilizer together with the phyllosilicate is mainly based on the bleeding-out preventing effect of the light stabilizer. That is, it appears that the phyllosilicate interacts on the light stabilizer in the composition to prevent the light stabilizer from being scatted and dissipated out of the system. It also appears that about the interaction, the phyllosilicate acts like a plate for blocking the bleeding-out, thereby suppressing the bleeding-out of the light stabilizer. It can be presumed that the reason why the light stabilizer having in the molecule thereof a group having a structure represented by a general formula (4), among the light stabilizers, produces a particularly remarkable effect is that the H atom bonded to the N atom is related to the effect.

When the light stabilizer is incorporated, the stabilizer is incorporated preferably in an amount of 0.1 to 20 parts, more preferably in an amount of 0.5 to 10 parts by weight per 100 parts by weight of the base resin made of the above-mentioned organic polymer, urethane resin, epoxy resin and/or modified polysulfide resin. If the amount is less than 0.1 part by weight, the weatherability-improving effect may be insufficient. If the amount is more than 20 parts by weight, a problem of coloration is caused so that the appearance as a sealing material may be damaged.

(Non-Halogen Type Flame Retardant)

It is preferable to incorporate, into the curable composition of the invention, a non-halogen type flame retardant in order to improve the flame retardancy thereof. The non-halogen type flame retardant, which is not particularly limited, may be of any kind which can give flame retardancy. Examples thereof include metal hydroxides such as magnesium hydroxide, aluminum hydroxide, dosonite, calcium aluminate, dihydrated plaster, and calcium hydroxide. Magnesium hydroxide and aluminum hydroxide are particularly preferable.

The metal hydroxides may be surface-treated with various surface treating agents. The surface treating agents, which are not particularly limited, may be, for example, a silane coupling agent, a titanate type coupling agent, a PVA type surface treating agent, an epoxy type surface agent, and the like. One or more out of these metal hydroxides are used. When two or more out of the metal hydroxides are used together, a higher flame retardancy can be obtained since the respective hydroxides start to undergo decomposition dehydration reaction at different temperatures.

The metal hydroxide causes endothermic dehydration reaction under high heat at the time of burning, thereby absorbing heat, and releases water molecules, thereby lowering the temperature of the spot of the burning. In this way, the metal hydroxide has an effect of improving the flame-retardancy. In the curable composition of the invention, the use of the hydroxide together with the phyllosilicate causes an increase in the flame retardancy based on the metal hydroxide. It appears that this is because the flame retardancy effect of the phyllosilicate, based on the film-formation at the time of burning, and the flame retardancy of the metal hydroxide, based on the dehydration reaction thereof, are synergistically expressed.

The blend amount of the non-halogen type flame retardant is preferably from 5 to 100 parts by weight per 100 parts by weight of the base resin made of the above-mentioned organic polymer, urethane resin, epoxy resin and/or modified polysulfide resin. If the amount is less than 5 parts by weight, the flame retardant effect is not easily exhibited sufficiently. If the amount is more than 100 parts by weight, the flame retardant effect is expressed whereas problems, such as an increase in the density and insufficient flexibility, are easily caused. The amount is more preferably from 20 to 60 parts by weight.

(Reactive Diluting Agent)

Preferably, a reactive diluting agent is further incorporated into the first invention.

The reactive diluting agent, which is preferably used in the invention, is a compound which gives fluidity to a composition composed of the organic polymer having the hydrolyzable silyl group and the reactive diluting agent by stress applied to the composition at 25° C., or by the weight of the curable composition itself. It is necessary that the reactive diluting agent has a viscosity of 10 to 5,000 cps at 25° C. The viscosity of the reactive diluting agent, which may be appropriately selected within the above-mentioned range, is preferably from 100 to 4,000 cps, more preferably from 1,000 to 3,000 cps. If the viscosity at 25° C. is less than 10 cps, the effect of diluting the organic polymer is excellent but the cohesive force of the diluting agent lowers remarkably. As a result, the cohesive force of the cured article may lower remarkably. Since the cohesive force of the diluting agent is low, an effect may be produced on environment by volatilization thereof. On the other hand, if the viscosity of the reactive diluting agent is more than 5,000 cps, the cohesive force of the organic polymer is so high that the fluidity of the curable composition lowers to make the usability thereof low.

The reactive group of the reactive diluting agent, which is not particularly limited, may be a hydrolyzable silyl group crosslinkable with the organic polymer, or a reactive group which causes crosslinking inside the reactive diluting agent so as to form an IPM (inter-irruption polymeric network). Examples of such a reactive group include an epoxy group, an isocyanate group, polymerizable unsaturated groups, and the like. It is sufficient that the number of the reactive groups contained in the reactive diluting agent is at least one per molecule of the reactive diluting agent. The number may be two or more.

Examples of the reactive diluting agent include polyalkylene glycol oligomers, such as polyethylene glycol, polypropylene glycol and polymethylene glycol, which have the above-mentioned reactive group; liquid rubbers, such as liquid polybutadiene, liquid polypropylene, liquid polysulfide, liquid polyisoprene and liquid polyisobutylene, which have the above-mentioned reactive group; low-viscosity type epoxy resins, such as alicyclic epoxy resin, hydrogenated bisphenol A type epoxy resin, and bisphenol F type epoxy resin; polysiloxane oligomers, such as dimethylsiloxane, methylphenylsiloxane and diphenylsiloxane, which have the above-mentioned reactive group; and polyester oligomers, urethane oligomers, polyamide oligomers and polyimide oligomers which have the above-mentioned reactive group, and the like.

It is preferable to use, as the reactive diluting agent, a compound which is an oligomer comprising a (meth)acrylic acid ester as a recurring unit and having a number-average polymerization degree of 3 to 50 and which has a reactive group. When the organic polymer is a vinyl polymer, this compound has an excellent solubility in the vinyl polymer and expresses a superior diluting effect. If the number-average polymerization degree is more than 50, the cohesive force is so high that a sufficient diluting effect may not be obtained. If the number-average polymerization degree is less than 3, volatized contents may be too rich.

The process for producing the reactive diluting agent which comprises a (meth)acrylic acid ester as a recurring unit may be the same process for producing the above-mentioned vinyl polymer. The (meth)acrylic acid ester monomer which can be used may be the (meth)acrylic acid ester monomer described about the process for producing the vinyl polymer.

It is permissible to incorporate, into the curable composition according to the invention, a compound for promoting the reactivity of the reactive diluting agent. For example, when the reactive group of the reactive diluting agent is an alkoxysilyl group, a curing catalyst for the vinyl polymer may be added as the present compound.

When the reactive group of the reactive diluting agent is an epoxy group, examples of the compound for promoting the reactivity include active esters, block amines such as ketimine, boron trifluoride/amine complexes, dicyandiamide, and thermally latent catalysts such as onium salts.

When the reactive group is an isocyanate group, examples of the compound for promoting the reactivity include block amines such as ketimine, tertiary amines, and organic tin compounds which can be used for promoting the curing of the vinyl polymer.

When the reactive group is a polymerizable unsaturated group, examples of the compound for promoting the reactivity include peroxides which turn to anaerobic catalysts.

These compounds, for promoting the reactivity, may be appropriately used dependently on the purpose or using manner of the curable composition of the present invention as far as the objects and the effects of the invention are not damaged.

About a blend ratio between the organic polymer and the reactive diluent agent, the amount of the reactive diluting agent is from 10 to 500 parts by weight per 100 parts by weight of the organic polymer. If the blend ratio of the reactive diluting agent is less than 10 parts by weight, the diluting effect may not be anymore expected. On the other hand, if the blend ratio is more than 500 parts by weight, the diluting effect is superior but the adhesiveness or elongation based on the organic polymer may not be anymore expected. More preferably, the amount of the reactive diluting agent is from 20 to 300 parts by weight per 100 parts by weight of the organic polymer.

(Compound having a Melting Point of 40 to 75° C.)

Preferably, the first and second inventions further comprise at least one compound which is selected from the group consisting of an amine compound, an amide compound and a fatty acid ester and has a melting point within the range of 40 to 75° C. in order to make the contamination resistance high.

The compound having a melting point within the range of 40 to 75° C. is not particularly limited as far as the compound is at least one which is selected from the group consisting of an amine compound, an amide compound and a fatty acid ester and has a melting point ranging from 40 to 75° C.

Examples of the amine compound having a melting point of 40 to 75° C. include stearylamine (melting point: 50° C.), diphenylamine (melting point: 53° C.), and the like. Examples of the amide compound having a melting point of 40 to 75° C. include oleic amide (melting point: 73° C.), ricinoleic amide (melting point: 65° C.) and the like.

Examples of the fatty acid ester having a melting point of 40 to 75° C. include N-stearyloleic amide (melting point: 67° C.), stearic acid monoglyceride (melting point: 58° C.), pentaerythritol tetrastearate (melting point: 65° C.), and stearyl stearate (melting point: 55° C.).

The compound having a melting point ranging from 40 to 75° C. falls in the temperature range between solid and liquid. Accordingly, for example, in the case that the curable composition according to the invention is cured to form a sealing material, the compound oozes out appropriately onto the outer surface of the sealing material, dependently on the surrounding temperature. In the meantime, the compound can easily be washed away with water. Accordingly, the compound oozing onto the surface is adhered or adsorbed onto stains on the outer surface, and then easily washed away with rainwater or washing water. Consequently, the contamination resistance of the outer surface of the sealing material is effectively enhanced.

As the compound having a melting point ranging from 40 to 75° C., a compound having both of a hydrophilic moiety and a hydrophobic moiety is particularly preferable. In this case, hydrophobic stains are adsorbed on the hydrophobic moiety and rainwater or washing water is easily washed away by action of the hydrophilic moiety. Examples of such a compound having both of a hydrophilic moiety and a hydrophobic moiety include stearylamine diphenylamine, and the like.

A great number of compounds having a melting point below 40° C. are liquid within such a temperature range that the sealing material or the like is used. The compound oozes out vigorously from the cured article. Conversely, therefore, the contamination resistance may lower. If the melting point is over 75° C., heating is necessary for dispersing the compound homogeneously at the stage of producing the curable composition. Consequently, the organic polymer, as the base component, and the others may deteriorate.

The blend ratio of the compound having a melting point ranging from 40 to 75° C. is desirably from 0.1 to 5 parts by weight per 100 parts by weight of the base resin. If the ratio is less than 0.1 part by weight, the stain-preventing effect is small. If the ratio is more than 5 parts by weight, the curable composition is too speedily cured. As a result, the curing time is shortened and the workability lowers.

(Silane Compound which Contains an Epoxy Group, and Ketimine Compound)

Preferably, the curable composition according to the first invention further comprises a silane compound which contains an epoxy group, and a ketimine compound, thereby improving the adhesiveness endurance of the curable article.

The silane compound which contains an epoxy group, or the epoxy group containing silane compound, means a compound having one or more epoxy groups and a hydrolyzable silyl group. Examples of such an epoxy group containing silane compound include 2-(3,4-epoxycyclohexyl)ethyltrimethoxysilane, 3-(glycidoxy)propyltrimethoxysilane, 3-glycidoxypropylmethyldiethoxysilane, and the like. The blend amount of the epoxy group containing silane compound preferably ranges from 0.1 to 10 parts by weight per 100 parts by weight of the base resin made of the organic polymer and the others. If the amount is less than 0.1 part by weight, the adhesiveness may be insufficient. If the amount is more than 10 parts by weight, the storage stability may deteriorate.

The ketimine compound used in the present invention, which is not particularly limited, is preferably a hydrolyzable silyl group containing ketimine compound.

The hydrolyzable silyl group containing ketimine compound is a compound represented by the following formula (A):

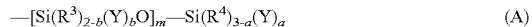
$$—[Si(R^3)_{2-b}(Y)_bO]_m—Si(R^4)_{3-a}(Y)_a \quad (A)$$

wherein $R^1$, $R^2$, $R^4$ and $R^5$ represent an alkyl group having 1 to 5 carbon atoms, $R^3$ represents an alkylene group having 1 to 10 carbon atoms, and x is 2 or 3.

Although the ketimine compound is stably present in the absence of water content, the compound generates a primary amine compound in the presence of water content. Thus, the compound acts as a curing agent which reacts with an epoxy group.

A specific example of the ketimine compound is 3-triethoxysilyl(1,3-dimethyl-butylidene)propylamine or the like. Specific examples of commercially available products thereof include article No. "S-340", manufactured by Chisso Corp., article No. "KBE-9103", manufactured by Shin-Etsu Chemical Co., Ltd and the like.

The blend ratio of the ketimine compound is desirably from 0.1 to 10 parts by weight per 100 parts by weight of the base resin. If the ratio is less than 0.1 part by weight, the adhesiveness is insufficient. If the ratio is more than 10 parts by weight, the storage ability may deteriorate.

In the case that the organic polymer is the vinyl organic polymer (b), which has a crosslinkable hydrolyzable silyl group, in the curable composition according to the invention, it is preferable to incorporate, into the composition, four organic tin compounds having at least an alkyl group having 8 or more carbon atoms and/or a thioether group.

The organic tin compound, which is not particularly limited, is a tetravalent organic compound wherein an alkyl group having 8 or more carbon atoms and/or a thioether group is substituted on at least one out of the substitutable moieties of the compound. The organic tin compound is incorporated in order to make the curing speed small and ensure a sufficient tack-free time, i.e., a usable time. Since the organic tin compound does not generate any unpleasant odor easily, the compound does not cause environmental pollution easily in the scene of work.

The tetravalent organic tin compound is not particularly limited if the compound is a compound wherein a tetravalent tin atom has an alkyl group having 8 or more carbon atoms, such as an octyl, nonyl or lauryl group, and/or a thioether.

Examples of the organic tin compound include dioctyltin distearate, dioctyltin dilaurate, dioctyltin diacetate, dioctyltin diversatate, dioctyltin oxide, dibutyl bis 2-(isononyloxycarbonyl)ethylthio tin and dibutyl bis 2-(isooctyloxycarbonyl)methylthio tin The organic tin compounds may be used alone or in combination of two or more thereof.

It is preferable that the total number of the alkyl group having 8 or more carbon atoms and/or the thioether bonded to the tetravalent tin is two since the organic tin compound gives excellent stability.

The blend ratio of the organic tin compound is preferably from 0.1 to 10 parts by weight, more preferably from 0.5 to 5 parts by weight per 100 parts by weight of the organic polymer (a) or 100 parts by weight of the total of the organic polymer (a) and the organic polymer (b). If the blend ratio of the organic tin compound is less than 0.1 part by weight, the effect of promoting the curing speed cannot be expected. If the blend ratio is more than 10 parts by weight, the performance of the cured article may not be sufficiently expressed since a fall in the cohesive force is caused.

Furthermore, an epoxy compound or a diamine compound may be incorporated into the present invention.

Epoxy Compound

An epoxy compound may be incorporated into the present invention in order to enhance the adhesiveness of the cured article of the curable composition. The epoxy compound is incorporated preferably at a ratio of 0.5 to 20 parts by weight to 100 parts by weight of the vinyl polymer (a) or 100 parts by weight of the total of the vinyl polymer (a) and the polyether polymer (b). If the ratio is less than 0.5 part by weight, the adhesive force is not sufficiently heightened. If the ratio is more than 20 parts by weight, the storage stability of the curable composition may lower.

The epoxy compound is not particularly limited, and the following may be used: epichlorohydrin-bisphenol A type epoxy resin, epichlorohydrin-bisphenol F type epoxy resin, flame retardant epoxy resins such as glycidyl ether of tetrabromobisphenol A, Novolak type epoxy resin, hydrogenated bisphenol A type epoxy resin, glycidyl ether type epoxy resin of a bisphenol A propylene oxide adduct, p-oxybenzoic acid glycidyl ether ester type epoxy resin, m-aminophenol type epoxy resin, diaminodiphenylmethane type epoxy resin, urethane-modified epoxy resin, various alicyclic epoxy resins, N,N-diglycidylaniline, N,N-diglycidyl-o-toluidinetriglycidyl isocyanurate, polyalkylene glycol diglycidyl ether, glycidyl ether of a polyhydric alcohol such as glycerin, hydantoin type epoxy resin, and epoxy compounds of an unsaturated polymer such as petroleum resin, and the like. The epoxy compound is not limited to these, and epoxy resins which are generally used can be used.

Diamine Compound

The diamine compound added to the present invention if necessary is not particularly limited. Examples thereof include 1,2-diaminopropane, 1,3-diaminopropane, hexamethylenediamine, m-phenyldiamine, diaminodiphenylmethane, m-xylenediamine, 2,6-diaminopyridine, trimethylhexamethylenediamine, and the like. The diamine compound is added preferably at a ratio of 0.1 to 20 parts by weight to 100 parts by weight of the base resin made of the vinyl polymer (a) or composed of the vinyl polymer (a) and the polyether polymer (b). If the ratio is less than 0.1 part by weight, the adhesiveness may not be sufficient. If the ratio is more than 20 parts by weight, the storage stability may lower.

If necessary, different additives may be incorporated into the curable composition of the invention. Usually, the additives of various kinds are incorporated into the curable composition to prepare another curable composition, which is used as a sealing material or an adhesive.

Examples of the different additives include an electrically conducting agent, an organic tin compound, a curing catalyst such as a silanol-condensing catalyst, a curing cocatalyst, a plasticizer, an adhesiveness-giving agent, a dehydrating agent, a filler, a drip preventive, and the like. If necessary, an age resistor, an antioxidant, a pigment, a perfume, a solvent and others may be incorporated.

The electrically conducting agent acts to give electric conductivity to the cured article of the curable composition of the invention. Accordingly, the incorporation of the electrically conducting agent makes it possible to form an electrically conductive sealing material, or an electrically conductive adhesive. The electrically conducting agent is classified into organic and inorganic types. As the organic electrically conducting agent, a surfactant called an organic electrolyte is effective. Surfactants are classified into anionic, cationic and nonionic surfactants. The cationic surfactants are most effective. Of the cationic surfactants, quaternary ammonium is effective. Examples of the inorganic electrically conducting agent include carbon black, eclectically conductive ZnO, and eclectically conductive titanium.

The added amount thereof is preferably from 5 to 200 parts by weight, more preferably from 10 to 100 parts by weight per 100 parts by weight of the base resin.

The curing catalyst is used to promote humidly-curing reaction for the curable composition into which the organic polymer is incorporated. Examples thereof include tin compounds such as dibutyltin dilaurate, dibutyltin oxide, dibutyltin diacetate, dibutyltin phthalate, bis(dibutyltin lauric acid) oxide, dibutyltin bisacetylacetonate, dibutyltin bis (malate monoester), tin octoate, dibutyltin octoate, and dioctyltin oxide; titanate compounds such as tetra-n-butoxy titanate, and tetraisopropoxy titanate; amine salts such as dibutylamine-2-ethyl hexoate; and other acidic catalysts and basic catalysts. In order to adjust the curing speed, a bivalent organic tin carboxylate having a relatively small curing speed may be used. Examples thereof include tin stearate, stannous octoate, dioctyl type tin compounds, and the like. These are used alone or in combination of two or more thereof.

The plasticizer is used to heighten the elongation of the cured article for a sealing material or the like or make the modulus thereof low. Examples of the plasticizer include phthalic acid esters such as dioctyl phthalate, dibutyl phthalate and butylbenzyl phthalate, aliphatic bibasic acid esters such as dioctyl adipate, isodecyl succinate and dibutyl sebacate, glycol esters such as diethylene glycol dibenzoate and pentaerythritol ester, aliphatic esters such as butyl oleate and methyl acetylricinolate, phosphates such as trioctyl phosphate and octyldiphenyl phosphate, epoxy plasticizers such as epoxidized soybean oil and epoxidized linseed oil, glycols such as polyethylene glycol and polypropylene glycol, chlorinated paraffin, polybutadiene, isoparaffin, and the like. One or more out of these may be used. Polypropylene glycol having a number-average molecular weight of 500 to 30,000 is particularly preferable from the viewpoints of safety, and safety such as resistance against bleeding-out.

In the case that the base resin comprises, as the main component, at least the organic polymer (b) having a crosslinkable hydrolyzable silyl group in the curable composition according to the invention, a (meth)acrylic polymer having a viscosity of 500 to 6,000 mPa·s at 25° C. is preferably used as the plasticizer. Such a (meth)acrylic polymer is not particularly limited if the viscosity thereof ranges form 500 to 6,000 mPa·s at 25° C. This (meth)acrylic polymer causes an improvement in the elongation property of the cured article of the curable composition without damaging the weatherability of the cured article. Since the viscosity is within the specified range, over-coating can easily be applied onto the curable composition. Furthermore, the (meth)acrylic polymer is excellent in compatibility with the vinyl polymer. When the vinyl polymer is a (meth) acrylic acid ester type polymer, the (meth)acrylic polymer is particularly excellent in the compatibility. Therefore, the (meth)acrylic polymer is not easily subjected to bleeding-out, and the contamination resistance of the curable composition is not damaged.

If the viscosity of the (meth)acrylic polymer is less than 500 mPa·s at 25° C., the polymer may bleed out into over-coating paint to make the paint soft. If the viscosity is more than 6,000 mPa·s, the over-coating property may lower. The viscosity at 25° C. is preferably from 2000 to 5,000 mPa·s.

The blend ratio of the (meth)acrylic polymer is desirably from 10 to 100 parts by weight to the vinyl polymer. If the ratio is less than 10 parts by weight, the elongation property may not be improved. If the ratio is more than 100 parts by weight, a bad effect may be produced on the over-coating property. When the polyether polymer is further contained, it is preferable to incorporate 10 to 100 parts by weight of the (meth)acrylic polymer per 100 parts by weight of the total of the vinyl polymer and the polyether polymer.

The (meth)acrylic polymer is not particularly limited if the polymer satisfies the above-mentioned viscosity range. More specifically, as such a (meth)acrylic polymer, the following can be used: article No. UP-1000 (molecular weight: 3000, viscosity at 25° C.: 1000 mPa·s), and article No. UP-1110 (molecular weight: 2500, viscosity at 25° C.: 1000 mPa·s) manufactured by Toagosei Co., Ltd., and others. It is also preferable to use, as the (meth)acrylic polymer, a (meth)acrylic polymer having no hydroxyl group. Examples of the (meth)acrylic polymer having no hydroxyl group include article Nos. ARUFON, UP-1000 and UP-1100 manufactured by Toagosei Co., Ltd, and others.

The use of the (meth)acrylic polymer having no hydroxyl group makes it possible to keep the storage stability good.

The molecular weight distribution (Mw/Mn) of the (meth) acrylic polymer is desirably 1.5 or less. If the molecular weight distribution is more than 1.5, the usability may lower. The molecular weight of the (meth)acrylic polymer is not particularly limited, and the polymer having a weight-average molecular weight of about 500 to 6,000 is used.

The blend amount of the plasticizer is desirably 80 parts or less by weight per 100 parts by weight of the base resin made of the organic polymer, urethane resin, epoxy resin and/or modified polysulfide resin. If the amount is more than 80 parts by weight, a problem may be brought into the coating property.

Examples of the adhesiveness-giving agent include a compound having in its single molecule an amino group and an alkoxysilyl group, and bissilyl compounds. The effect thereof is particularly remarkably exhibited in the curable composition made of the organic polymer. Examples of the compound having in its single molecule an amino group and an alkoxysilyl group include 3-aminopropyltrimethoxysilane, 3-aminopropylmethyldimethoxysilane, 3-aminopropyltriethoxysilane, N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, N,N'-bis-[3-(trimethoxysilyl) propyl]ethylenediamine, N,N'-bis-[3-(triethoxysilyl)propyl] ethylenediamine, N,N'-bis-[3-(methyldimethoxysilyl) propyl]ethylenediamine, N,N'-bis-[3-(trimethoxysilyl) propyl]hexamethylenediamine, N,N'-bis-[3-(triethoxysilyl) propyl]hexamethylenediamine, N,N'-bis-[3-(methyldimethoxysilyl)propyl]hexamethylenediamine, N,N-bis-[3-(trimethoxysilyl)propyl]ethylenediamine, N,N-bis-[3-(methyldimethoxysilyl)propyl]ethylenediamine, N,N-bis-[3-(triethoxysilyl)propyl]ethylenediamine, N,N- bis-[3-(trimethoxysilyl)propyl]hexamethylenediamine, N,N-bis-[3-(methyldimethoxysilyl)propyl]hexamethylenediamine, N,N-bis-[3-(triethoxysilyl)propyl]hexamethylenediamine, N,N-bis-[3-(trimethoxysilyl)propyl]amine, N,N-bis-[3-(triethoxysilyl)propyl]amine, N,N-bis-[3-(methyldimethoxysilyl)propyl]amine, and the like. These may be used alone or in combination of two or more thereof.

Examples of the bissilyl compound include bissilyl compounds represented by the following general formula(e) (5), (6) and (7).

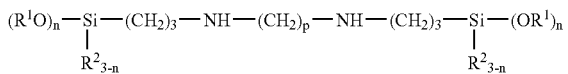

Formula (5)

wherein $R^1$ and $R^2$ each represent a methyl group or an ethyl group, n represents an integer of 1 to 3, and p represents an integer of 2 to 6.

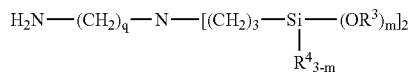

Formula (6)

wherein $R^3$ and $R^4$ each represent a methyl group or an ethyl group, m represents an integer of 1 to 3, and q represents an integer of 2 to 6.

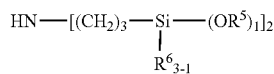

Formula (7)

wherein $R^5$ and $R^6$ each represent a methyl group or an ethyl group, and l represents an integer of 1 to 3.

Examples of the bissilyl compound represented by the general formula (5) include N,N'-bis-[3-(trimethoxysilyl)propyl]ethylene diamine, N,N'-bis-[3-(triethoxysilyl)propyl]ethylenediamine, N,N'-bis-[3-(methyldimethoxysilyl)propyl]ethylenediamine, N,N'-bis-[3-(trimethoxysilyl)propyl]hexametylenediamine, N,N'-bis-[3-(triethoxysilyl)propyl]hexametylenediamine, N,N'-bis-[3-(methyldimethoxysilyl)propyl]hexametylenediamine, and the like.

Examples of the bissilyl compound represented by the general formula (6) include N,N-bis-[3-(trimethoxysilyl)propyl]ethylene diamine, N,N-bis-[3-(triethoxysilyl)propyl]ethylenediamine, N,N-bis-[3-(methyldimethoxysilyl)propyl]ethylenediamine, N,N-bis-[3-(trimethoxysilyl)propyl]hexamethylenediamine, N,N-bis-[3-(triethoxysilyl)propyl]hexamethylenediamine, N,N-bis-[3-(methyldimethoxysilyl)propyl]hexamethylenediamine, and the like.

Examples of the bissilyl compound represented by the general formula (7) include N,N-bis-[3-(trimethoxysilyl)propyl]amine, N,N-bis-[3-(triethoxysilyl)propyl]amine, N,N-bis-[3-(methyldimethoxysilyl)propyl]amine, and the like.

If the added amount of the bissilyl compound is small, a sufficient adhesiveness-improving effect may not be obtained. If the amount is large, the elongation of the cured article after curing may deteriorate. Thus, the added amount is preferably from 0.05 to 5 parts by weight, more preferably from 0.1 to 3 parts by weight per 100 parts by weight of the base resin.

The dehydrating agent is used to remove water content invading when the curable composition of the invention into which the organic polymer or the urethane resin is incorporated is stored. Examples thereof include silane compounds such as vinyltrimethoxysilane, dimethyldimethoxysilane, tetraethoxysilane, methyltrimethoxysilane, methyltriethoxysilane, tetramethoxysilane, tetraethoxysilane, phenyltrimethylsilane, and diphenyldimethoxysilane; hydrolyzable ester compounds such as methyl orthoformate, ethyl orthoformate, methyl orthoacetate, and ethyl orthoacetate, and the like. These may be used alone or in combination of two or more thereof.

The filler is used to reinforce the cured article. Examples thereof include calcium carbonate (heavy and light), surface-treated calcium carbonate (heavy and light), calcium oxide, magnesium carbonate, hydrated silicic acid, silicic anhydride, fine particle silica, calcium silicate, titanium dioxide, mica powder, clay, talc, carbon black, organic and inorganic balloons, rubber powder, wollastonite, carbon fiber, cement for giving adhesive endurance, and the like. One or more out of these may be used.

Of these fillers, calcium carbonate having particle sizes of 0.5 to 2 μm is preferably used in order to prevent surface cracks after a weatherability test.

The calcium carbonate may be heavy or light, and surface-treated calcium carbonate may be used.

It is more preferable to use calcium carbonate treated with an organic carboxylic acid having a polymerizable unsaturated group. As the calcium carbonate in this case, any one of heavy calcium carbonate and light calcium carbonate can be used.

The organic carboxylic acid having a polymerizable unsaturated group is a compound having in the single molecule thereof a polymerizable unsaturated group and an organic carboxylic acid. Examples thereof include (met)acrylic acid, unsaturated fatty acids, maleic acid, cinnamic acid, 2-[(meth)acryloyloxy]ethylphthalic acid, and the like.

The method for treating calcium carbonate with the organic carboxylic acid having a polymerizable unsaturated group is not particularly limited as far as the surface of calcium carbonate can be treated with the organic carboxylic acid having the polymerizable unsaturated group. For example, the treatment is conducted by dispersing calcium carbonate into the organic carboxylic acid having a polymerizable unsaturated group and subsequently removing the organic carboxylic acid.

By the treatment of calcium carbonate with the organic carboxylic acid having a polymerizable unsaturated group, Ca of the calcium carbonate and the organic carboxylic acid are bonded to each other on the surface of the calcium carbonate. Moreover, the polymerizable unsaturated group is present on the surface of the calcium carbonate, and this polymerizable unsaturated group forms a bond with the cured article of the organic polymer (a) and/or the organic polymer (b). Therefore, the power for binding the base resin, which is the cured article, and calcium carbonate in the interface therebetween is enhanced. Thus, the elasticity limit of the rubbery cured article is enhanced so that the elongation of the cured article can be made large.

The blend ratio of the calcium carbonate treated with the organic carboxylic acid having a polymerizable unsaturated group is preferably from 10 to 200 parts by weight per 100 parts by weight of the base resin. If the blend ratio is less than 10 parts by weight, the effect of improving the elongation of the cured article may not be sufficiently obtained. If the ratio is more than 200 parts by weight, the viscosity of the curable composition becomes remarkably high so that the coating property may lower. More preferably, the calcium carbonate is blended at a ratio of 50 to 170 parts by weight to 100 parts by weight of the base resin.

Examples of the drip preventive include hydrogenated castor oil, fatty acid bisamide, fumed silica, and the like.

Examples of the solvent include synthetic isoparaffin type solvents having a flash point of 40° C. or more, or the like.

BEST MODE FOR CARRYING OUT THE INVENTION

Figure 1:
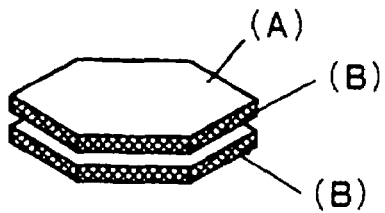
FIG. 1 is a schematic view for explaining a crystal surface (A) and crystal end faces (B) of a thin piece form crystal of phyllosilicate.
Figure 2:
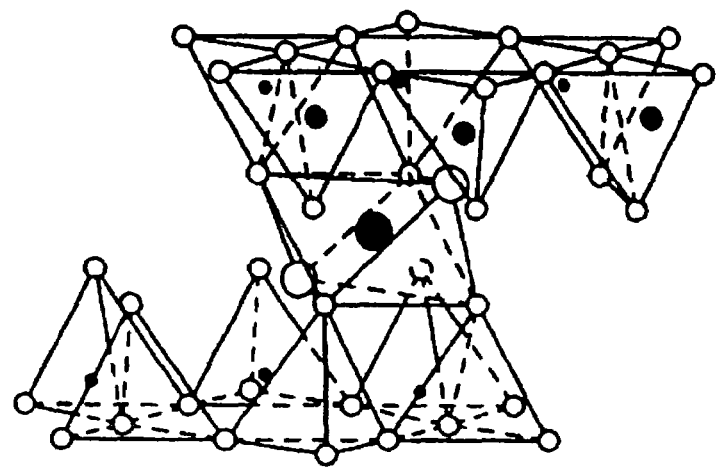
FIG. 2 is a view which schematically illustrates spaces between layers of phyllosilicate.
Figure 2:
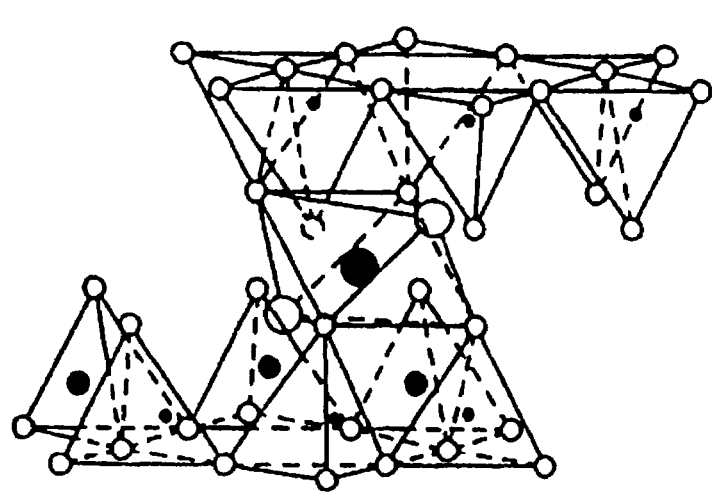

The present invention is described in more detail by way of the following examples. The present invention is not limited by the following examples. In the following description, the word "part(s)" means "part(s) by weight" unless otherwise specified.

[Preparation of Room-Temperature-Curable Compositions]

EXAMPLES 1 TO 15 AND COMPARATIVE EXAMPLES 1 TO 7

Respective materials were blended in accordance with each blend composition in Tables 1, 2 or 3, and homogeneously mixed under reduced pressure by use of a mixing stirrer sealed up in such a manner that moisture from the outside could not enter the stirrer. In this way, each curable composition was yielded. Details of the used materials are as follows.

(a) Main Components

MS polymer S203 (organic polymer (a) comprising as its main chain a polyether polymer, number-average molecular weight 20,000, manufactured by Kaneka Corp.)

MS polymer S303 (organic polymer (a) comprising as its main chain a polyether polymer and having a crosslinkable hydrolyzable silyl group, number-average molecular weight: 20,000, manufactured by Kaneka Corp.)

Urethane resin: resin (NCO content: 7.5%) obtained by causing 100 parts by weight of polypropylene glycol having a weight-average molecular weight of 2000 and 50 parts by weight of crude MDI (44V-20, manufactured by Sumitomo Bayer Urethane Co., Ltd.) (NCO/OH=7.4) to react with each other in nitrogen gas flow at 90° C. for 5 hours Epicoat 837 (manufactured by Yuka Shell Epoxy Co. Ltd., epoxy resin)

Epomate LX-3S (manufactured by Yuka Shell Epoxy Co. Ltd., epoxy resin)

Permapol P-500 (manufactured by Nippon Syokubai Co., Ltd., modified polysulfide resin)

Somashif MPE-100 (swellable fluorine mica organically-treated with polyoxypropylene diethyl quaternary ammonium salt, manufactured by Co-op Chemical Co., Ltd.)

(b) Other Components

Tinuvin 770 (hindered amine light stabilizer, manufactured by Chiba Specialty Chemicals Co.)

Tinuvin 765 (hindered amine light stabilizer, manufactured by Chiba Specialty Chemicals Co.)

Tinuvin 327 (benzotriazole type ultraviolet absorbers, manufactured by Chiba Specialty Chemicals Co.)

Non-halogen type flame retardant: magnesium hydroxide (manufactured by Kyowa Chemical Industry Co., Ltd., trade name: Kisuma 5J)

Calcium carbonate (manufactured by Shiraishi Kogyo Co., trade name: Hakuenka CCR, and the calcium carbonate was dried at 110° C. under reduced pressure, and then used.)

Titanium oxide (Titanium oxide was dried at 110° C. under reduced pressure, and then used.)

Carbon fiber (fiber diameter: 7 μm, fiber length: 9 mm, use of no sizing agent, manufactured by Toho Rayon Co., Ltd., trade name: HTA-C9)

Portland cement (manufactured by Chichibu Onoda cement Corp.)

Dehydrating agent: vinyltrimethoxysilane (manufactured by Chisso Corp., trade name: Saira Ace S210)

Adhesiveness-giving agent (manufactured by Shin-Etsu Chemical Co., Ltd., trade name: KBM-603)

Plasticizer: polypropylene glycol (number-average molecular weight: 3,000, manufactured by Mitsui Chemicals, Inc., trade name: Diol 3,000)

[Measurement of Average Interlayer Distance of Phyllosilicate]

The average interlayer distance of the phyllosilicate in the resultant curable composition was measured as follows.

An X-ray diffractometry device (manufactured by Rigaku Corp., RINT1100) was used to measure the 2 θ of a diffraction peak obtained by diffraction of laminated planes of the phyllosilicate, and the following Bragg's diffraction equation was used to calculate the interval between the (001) planes of the phyllosilicate. The following d was used as average interlayer distance. The case that the average interlayer distance was 3 nm or more was judged as goodness (○).

$$\lambda = 2d \sin \theta$$

In the equation, λ (nm)=0.154, d (nm) is the lattice plane distance of the phyllosilicate, and θ (degree) is the diffraction angle.

[Check of Dispersion State of Phyllosilicate]

From a transmission electron microscope (TEM "JEM-1200 EXII" manufactured by JEOL Ltd.) photograph, the dispersion state of the phyllosilicate in the cured article was observed. The case that the phyllosilicate was present in the form of 5 or less layers was judged as goodness (○)

[Evaluation]

The weatherability and the flame retardancy of the curable compositions obtained in the above-mentioned Examples and Comparative Examples were evaluated by methods described below, and the results are shown in Tables 1, 2 and 3.

(1) Weatherability

Each of the blend compositions was applied onto a stainless steel plate having a size of 50 mm×150 mm (thickness: 1 mm) so as to have a thickness of 0.5 mm, and the resultant was allowed to stand still in a 20° C., 60% RH atmosphere for 7 days (144 hours) so as to be cured. Thereafter, light was radiated onto the cured article for 150 hours and 400 hours under the following conditions. The surface state thereof was checked with the naked eye, and the case that no cracks were observed was judged as goodness (○).

Light Radiating Conditions

Test device: Eye Super UV tester (SUV-F11 model), manufactured by Iwasaki Electric Co., Ltd., Radiation intensity: 100 mW/cm², Restricted wavelength: 295 to 450 nm Black panel temperature: 63° C., and Radiation distance: 235 nm (between a light source and the sample)

(2) Flame Retardancy

Each of the blend compositions was molded to have a width of 25 mm and a thickness of 1 mm, and the resultant was allowed to stand still in a 20° C., 60% RH atmosphere for 7 days (168 hours), so as to be cured. Thereafter, the cured article was put in reducing flames and perpendicularly to the flames for 5 seconds, so as to be positioned 10 mm apart from the tips of the flames.

Thereafter, the cured article was pulled back from the flames. The case that the article did not burn with flames for 5 or more seconds was judged as goodness (○), and the case that flames went out in 5 to 30 seconds was judged as slight goodness (Δ).

TABLE 1

|  |  |  |  | Example |  |  |  |  |  |  |  |
|---|---|---|---|---|---|---|---|---|---|---|---|
|  |  |  |  | 1 | 2 | 3 | 4 | 5 | 6 | 7 | 8 |
| Blend Composition | Organic Polymer | Modified Silicone Polymer | MS Polymer S203 | (p.b.w.) | 50 | 50 | 50 | 50 | 50 | 50 | 50 | 50 |
|  |  |  | MS Polymer S303 | (p.b.w.) | 50 | 50 | 50 | 50 | 50 | 50 | 50 | 50 |
|  |  | Urethane Resin |  | (p.b.w.) |  |  |  |  |  |  |  |  |
|  | Epoxy Resin | Resin | Epicoat 837 | (p.b.w.) |  |  |  |  |  |  |  |  |
|  |  | Curing Agent | Epomate LX-3S | (p.b.w.) |  |  |  |  |  |  |  |  |
|  | Modified Polysulfide |  | Permapol P-500 | (p.b.w.) |  |  |  |  |  |  |  |  |
|  | Phyllosilicate |  | Somashif MPE-100 | (p.b.w.) | 5 | 5 | 10 | 5 | 5 | 10 | 5 | 5 |
|  | Light Stabilizer |  | Tinuvin 770 | (p.b.w.) | 3 | 5 | 5 | 5 | 5 | 3 |  |  |
|  |  |  | Tinuvin 765 | (p.b.w.) |  |  |  |  |  |  |  | 5 |
|  | Ultraviolet Absorber (Benzotriazole Type) |  | Tinuvin 327 | (p.b.w.) | 3 | 5 | 5 | 5 | 3 | 5 | 5 | 3 |
|  | Non Halogen Type Flame Retardant (Magnesium Hydroxide) |  | Kisuma 5J | (p.b.w.) | 20 |  |  | 20 |  |  | 20 |  |
|  | Fillers | Colloidal Calcium Carbonate | Hakuenka CCR | (p.b.w.) | 150 | 150 | 150 | 150 | 150 | 150 | 150 | 150 |
|  |  | Titanium Oxide |  | (p.b.w.) | 20 | 20 | 20 | 20 | 20 | 20 | 20 | 20 |
|  |  | Carbon Fiber | HTA-C9 | (p.b.w.) |  |  |  |  |  |  |  |  |
|  |  | Calcium Oxide |  | (p.b.w.) |  |  |  |  |  |  |  |  |
|  |  | Cement | Portland Cement | (p.b.w.) |  |  |  |  |  |  |  |  |
|  | Dehydrating Agent |  | Saira Ace S210 | (p.b.w.) | 3 | 3 | 3 | 3 | 3 | 3 | 3 | 3 |
|  |  |  | Diphenyldimethoxysilane | (p.b.w.) |  |  |  |  |  |  |  |  |
|  | Adhesiveness-giving Agent |  | KBM-603 | (p.b.w.) | 2 | 2 | 2 | 2 | 2 | 2 | 2 | 2 |
|  | Silanol-condensing Agent |  | Dibutyltin Dilaurate | (p.b.w.) | 2 | 2 | 2 | 2 | 2 | 2 | 2 | 2 |
|  | Plasticizer |  | Diol 3000 | (p.b.w.) | 40 | 40 | 40 | 40 | 40 | 40 | 40 | 40 |
| Evaluation Results | Average Intermediate Layer Distance of Phyllosilicate |  |  | (p.b.w.) | ○ | ○ | ○ | ○ | ○ | ○ | ○ | ○ |
|  | Dispersion State of Phyllosilicate |  |  | (p.b.w.) | ○ | ○ | ○ | ○ | ○ | ○ | ○ | ○ |
|  | Weatherability (150 hours) |  |  | (p.b.w.) | ○ | ○ | ○ | ○ | ○ | ○ | ○ | ○ |
|  | Weatherability (400 hours) |  |  | (p.b.w.) | ○ | ○ | ○ | ○ | ○ | ○ | ○ | X |
|  | Flame Retardancy |  |  | (p.b.w.) | ○ | Δ | Δ | ○ | Δ | Δ | ○ | ○ | p.b.w. = parts by weight

TABLE 2

|  |  |  |  | Example |  |  |  |  |  |  |
|---|---|---|---|---|---|---|---|---|---|---|
|  |  |  |  | 9 | 10 | 11 | 12 | 13 | 14 | 15 |
| Blend Composition | Organic Polymer | Modified Silicone Polymer | MS Polymer S203 | (p.b.w.) |  |  |  |  |  | 50 | 50 |
|  |  |  | MS Polymer S303 | (p.b.w.) |  |  |  |  |  | 50 | 50 |
|  |  | Urethane Resin |  | (p.b.w.) | 100 |  | 100 |  |  |  |  |
|  | Epoxy Resin | Resin | Epicoat 837 | (p.b.w.) |  | 90 |  |  |  |  |  |
|  |  | Curing Agent | Epomate LX-3S | (p.b.w.) |  | 10 |  |  |  |  |  |
|  | Modified Polysulfide |  | Permapol P-500 | (p.b.w.) |  |  |  | 100 | 100 |  |  |
|  | Phyllosilicate |  | Somashif MPE-100 | (p.b.w.) | 5 | 5 | 10 | 5 | 5 | 5 | 10 |
|  | Light Stabilizer |  | Tinuvin 770 | (p.b.w.) | 1 | 2 | 1 | 2 | 2 | 2 | 2 |
|  |  |  | Tinuvin 765 | (p.b.w.) |  |  |  |  |  |  |  |
|  | Ultraviolet Absorber (Benzotriazole Type) |  | Tinuvin 327 | (p.b.w.) | 1 | 1 | 1 | 2 | 2 | 2 | 2 |
|  | Non Halogen Type Flame Retardant (Magnesium Hydroxide) |  | Kisuma 5J | (p.b.w.) |  |  | 20 |  |  |  |  |
|  | Fillers | Colloidal Calcium Carbonate | Hakuenka CCR | (p.b.w.) |  |  |  | 100 | 100 | 150 | 150 |
|  |  | Titanium Oxide |  | (p.b.w.) |  |  |  | 20 | 20 | 20 | 20 |

TABLE 2-continued

|  |  |  | | Example | | | | | | |
|---|---|---|---|---|---|---|---|---|---|---|
|  |  |  | | 9 | 10 | 11 | 12 | 13 | 14 | 15 |
|  | Carbon Fiber | HTA-C9 | (p.b.w.) |  |  |  | 5 |  |  |  |
|  | Calcium Oxide |  | (p.b.w.) |  |  |  |  | 5 |  |  |
|  | Cement | Portland Cement | (p.b.w.) |  |  |  |  |  |  | 50 |
|  | Dehydrating Agent | Saira Ace S210 | (p.b.w.) |  |  |  |  |  |  |  |
|  |  | Diphenyldimethoxysilane | (p.b.w.) |  |  |  |  |  | 3 |  |
|  | Adhesiveness-giving Agent | KBM-603 | (p.b.w.) |  |  |  |  |  |  |  |
|  | Silanol-condensing Agent | Dibutyltin Dilaurate | (p.b.w.) |  |  |  |  |  |  |  |
|  | Plasticizer | Diol 3000 | (p.b.w.) | 40 | 40 | 40 | 40 | 40 | 40 | 40 |
| Evaluation | Average Intermediate Layer Distance of Phyllosilicate | | (p.b.w.) | ○ | ○ | ○ | ○ | ○ | ○ | ○ |
| Results | Dispersion State of Phyllosilicate | | (p.b.w.) | ○ | ○ | ○ | ○ | ○ | ○ | ○ |
|  | Weatherability (150 hours) | | (p.b.w.) | ○ | ○ | ○ | ○ | ○ | ○ | ○ |
|  | Weatherability (400 hours) | | (p.b.w.) | ○ | ○ | ○ | ○ | ○ | ○ | ○ |
|  | Flame Retardancy | | (p.b.w.) | Δ | Δ | ○ | Δ | Δ | Δ | Δ | p.b.w. = parts by weight

TABLE 3

|  |  |  |  | | Comparative Example | | | | | | | | | |
|---|---|---|---|---|---|---|---|---|---|---|---|---|---|---|
|  |  |  |  | | 1 | 2 | 3 | 4 | 5 | 6 | 7 | 8 | 9 | 10 |
| Blend | Organic | Modified | MS Polymer S203 | (p.b.w.) | 50 | 50 | 50 |  |  |  | 50 | 50 | 50 | 50 |
| Composition | Polymer | Silicone Polymer | MS Polymer S303 | (p.b.w.) | 50 | 50 | 50 |  |  |  | 50 | 50 | 50 | 50 |
|  | Urethane Resin | | | (p.b.w.) |  |  |  | 100 |  |  |  |  |  |  |
|  | Epoxy | Resin | Epicoat 837 | (p.b.w.) |  |  |  |  |  |  |  |  |  |  |
|  | Resin | Curing Agent | Epomate LX-3S | (p.b.w.) |  |  |  |  | 90 |  |  |  |  |  |
|  | Modified Polysulfide | | Permapol P-500 | (p.b.w.) |  |  |  |  | 10 | 100 |  |  |  |  |
|  | Phyllosilicate | | Somashif MPE-100 | (p.b.w.) |  |  |  |  |  |  |  |  | 0.05 | 110 |
|  | Light Stabilizer | | Tinuvin 770 | (p.b.w.) | 3 |  |  | 2 | 2 | 2 |  |  | 3 | 3 |
|  |  |  | Tinuvin 765 | (p.b.w.) |  | 3 | 3 |  |  |  |  |  |  |  |
|  | Ultraviolet Absorber | | Tinuvin 327 | (p.b.w.) | 3 | 3 | 5 | 1 | 1 | 2 | 2 |  | 3 | 3 |
|  | (Benzotriazole Type) | | | | | | | | | | | | | |
|  | Non Halogen Type | | Kisuma 5J | (p.b.w.) |  | 20 | 20 |  | 20 |  |  |  | 20 | 20 |
|  | Flame Retardant | | | | | | | | | | | | | |
|  | (Magnesium Hydroxide) | | | | | | | | | | | | | |
|  | Fillers | Colloidal Calcium | Hakuenka CCR | (p.b.w.) | 150 | 150 | 150 |  | 100 | 2 | 150 | 150 | 150 |  |
|  |  | Carbonate | | | | | | | | | | | | |
|  |  | Titanium Oxide | | (p.b.w.) | 20 | 20 | 20 |  | 20 |  | 20 | 20 | 20 |  |
|  |  | Carbon Fiber | HTA-C9 | (p.b.w.) |  |  |  |  |  | 5 | 150 |  |  |  |
|  |  | Calcium Oxide | | (p.b.w.) |  |  |  |  |  |  | 20 |  |  |  |
|  |  | Cement | Portland Cement | (p.b.w.) |  |  |  |  |  |  |  |  |  |  |
|  | Dehydrating Agent | | Saira Ace S210 | (p.b.w.) | 3 | 3 | 3 |  |  |  |  | 3 | 3 | 3 |
|  |  | | Diphenyldimethoxysilane | (p.b.w.) |  |  |  |  |  |  | 3 |  |  |  |
|  | Adhesiveness-giving Agent | | KBM-603 | (p.b.w.) | 2 | 2 | 2 |  |  |  |  |  |  |  |
|  | Silanol-condensing Agent | | Dibutyltin Dilaurate | (p.b.w.) | 2 | 2 | 2 |  |  |  |  |  |  |  |
|  | Plasticizer | | Diol 3000 | (p.b.w.) | 40 | 40 | 40 | 40 | 40 | 40 | 40 | 40 | 40 | 40 |
| Evaluation | Average Intermediate Layer Distance of Phyllosilicate | | | (p.b.w.) |  |  |  |  |  |  |  |  | ○ | ○ |
| Results | Dispersion State of Phyllosilicate | | | (p.b.w.) |  |  |  |  |  |  |  |  | ○ | ○ |
|  | Weatherability (150 hours) | | | (p.b.w.) | X | ○ | ○ | ○ | ○ | ○ | ○ | X | ○ | * |
|  | Weatherability (400 hours) | | | (p.b.w.) | X | X | X | X | X | X | X | X | X | * |
|  | Flame Retardancy | | | (p.b.w.) | X | X | X | X | X | X | X | X | X | ○ | p.b.w. = parts by weight
* Bad Appearance because of Precipitation of Phyllosilicate

EXAMPLES 16 TO 18, AND COMPARATIVE EXAMPLES 8 AND 9

About polymer synthesis, the following polymers A and B were yielded in the same way as in Comparative Synthesis Example 1 and Synthesis Example 1 described in JP-A No. 11-100433.

VINYL POLYMER SYNTHESIS EXAMPLE 1

Synthesis of poly(n-butyl acrylate) having a crosslinkable silyl group by use of a monomer containing a crosslinkable silyl group (hereinafter referred to as the polymer A).

While 400 g of toluene, 385 g of butyl acrylate, 15 g of methyl dimethoxypropylmethacrylate, and 6 g of azobisisobutyronitrile were bubbled with nitrogen in a one-liter flask, polymerization was conducted at 105° C. for 7 hours. Toluene was distilled off, thereby yielding poly(n-butyl acrylate) having a crosslinkable silyl group as the polymer A.

The viscosity of the polymer A was 74 Pa·s at a temperature of 23° C. The number-average molecular weight (Mn) was 8500 by GPC measurement (polystyrene standard), and the molecular weight distribution (Mw/Mn) was 2.5. The average number of the hydroxyl groups per molecule of the polymer, obtained by 1H-NMR analysis, was 1.4.

POLYMER SYNTHESIS EXAMPLE 2

Synthesis of poly(n-butyl acrylate) having at its terminal a crosslinkable silyl group (hereinafter referred to as the polymer B).

In a 50 mL flask were charged 0.63 g of cuprous bromide, 0.76 g of pentamethyldiethylenetriamine, 5 mL of acetonitrile, 0.78 g of diethyl 2,5-dibromoadipate and 44.7 g of butyl acrylate, and then the resultant solution was subjected to freezing degassing. Thereafter, the reactive components were caused to react at a temperature of 70° C. in nitrogen atmosphere for 6 hours. The resultant was passed through a column filled with active alumina to remove the copper catalyst and perform purification, thereby yielding a polymer having at its terminal a Br group. The number-average molecular weight of the resultant polymer was 23,600 by GPC measurement (polystyrene standard), and the molecular weight distribution was 1.1.

Into a 200 mL flask were charged 34 g of the Br group-terminated polymer obtained as described above, 1.0 g of potassium pentenoate, and 34 mL of N,N-dimethylacetoamide (DMAc) in nitrogen atmosphere, and then the reactive components were caused to react at 70° C. for 4 hours. Unreacted potassium pentenoate in the mixed reaction solution and generated potassium bromide were extracted with water, and removed, so as to yield a polymer having at its terminal an alkenyl group.

The alkenyl group-terminated polymer and aluminum silicate, the weights thereof being equal to each other (30.5 g), were mixed with toluene, and the resultant solution was stirred at 100° C. After 4 hours, aluminum silicate was filtrated, and volatile components in the filtrate were heated under reduced pressure so as to be distilled off. In this way, a polymer was obtained. The number-average molecular weight of the resultant polymer was 24,800 by GPC measurement (polystyrene standard), and the molecular weight distribution was 1.1. The number of the alkenyl groups per molecule of the polymer, obtained by 1H-NMR analysis, was 1.5.

Into a 200 mL pressure-resistant reaction tube were charged 21 g of the alkenyl group-terminated polymer obtained as described above, 0.94 mL of methyldimethoxysilane, 0.13 mL of methyl orthoformate, and $2 \times 10^{-4}$ mmol of bis(divinyltetramethyldisiloxane) platinum, and then the reactive components were caused to react at 100° C. for 4 hours, thereby yielding the polymer B having at its terminal a crosslinkable silyl group. The viscosity of the resultant polymer was 100 Pa·s at 23° C. The number-average molecular weight was 25,400 by GPC measurement (polystyrene standard), and the molecular weight distribution was 1.2. The number of the crosslinkable silyl groups per molecule of the polymer B, obtained by 1H-NMR analysis, was 1.5.

The polymer A or polymer B, a filler, a plasticizer, a dehydrating agent, an adhesiveness-giving agent, a silanol-condensing catalyst, a hindered amine light stabilizer, a benzotriazole type ultraviolet absorber, and a phyllosilicate were homogeneously mixed in blended amounts shown in Table 4 under reduced pressure in a mixing stirrer sealed up in such a manner that moisture from the outside could not enter the stirrer, thereby yielding a curable composition.

About the calcium carbonate, calcium carbonate dried at 110° C. in advance under reduced pressure-was used.

[Polymers]
"Polymer A"
"Polymer B"

[Fillers]
Calcium carbonate ("CCR", manufactured by Shiraishi Kogyo Co.)
Titanium oxide ("R-820", manufactured by Ishihara Sangyo Kaisha, Ltd.)

[Plasticizer]
Diol 3000 (manufactured by Mitsui Chemicals, Inc., polypropylene glycol, Mn=3000)

[Others]
Vinyltrimethoxysilane (dehydrating agent, "Saira Ace S210", manufactured by Chisso Corp.)
KBM-603 (adhesiveness-giving agent, manufactured by Shin-Etsu Chemical Co., Ltd., N-(2-aminoethyl)-3-aminopropyltrimethoxysilane)
Dibutyltin dilaurate (silanol-condensing catalyst)
Sanol LS770 (hindered amine light stabilizer manufactured by Sankyo Co.)
Tinuvin 327 (benzotriazole type ultraviolet absorber, manufactured by Chiba Specialty Chemicals Co.)
Somashif MPE-100 (swellable fluorine mica organically-treated with polyoxypropylene diethyl quaternary ammonium salt, manufactured by Co-op Chemical Co., Ltd.)

About the curable compositions obtained in the above-mentioned Examples and Comparative Examples, the following performances were evaluated, and the results are shown in Table 4.

(1) Weatherability

Each of the blend compositions was applied onto a stainless steel plate having a size of 50 mm×150 mm (thickness: 1 mm) so as to have a thickness of 0.5 mm, and then cured. Thereafter, light was radiated under the following conditions. The surface state thereof was evaluated by observation with the naked eye.

Light Radiating Conditions
Test device: Eye Super UV tester "SUV-F11 model", manufactured by Iwasaki Electric Co., Ltd.,
UV intensity: 100 mW/cm$^2$,
Restricted wavelength: 295 to 450 nm
Black panel temperature: 63° C., and
Radiation distance: 235 nm (between a light source and the sample).

The cured films were observed with the naked eye whenever the light radiation was performed for 300 hours by means of the above-mentioned test device. The film having on its surface no cracks was judged as goodness (o), and the film having on its surface one or more generated cracks was judged as badness (x).

TABLE 4

|  | Ex. 16 | Ex. 17 | Ex. 18 | Comp. Ex. 8 | Comp. Ex. 9 |
| --- | --- | --- | --- | --- | --- |
| Polymer | Polymer A | Polymer A | Polymer B | Polymer A | Polymer B |
| Calcium Carbonate | 100 | 100 | 100 | 100 | 100 |
| Titanium Oxide | 20 | 20 | 20 | 20 | 20 |
| Diol 3000 | 50 | 50 | 50 | 50 | 50 |
| Vinyltrimethoxysilane | 3 | 3 | 3 | 3 | 3 |
| N-(2-aminoethyl)-3-aminopropyl-trimethoxysilane | 2 | 2 | 2 | 2 | 2 |
| Dibutyltin Dilaurate | 2 | 2 | 2 | 2 | 2 |
| Sanol LS770 | 1 | 1 | 1 | 1 | 1 |
| Tinuvin 327 | 1 | 1 | 1 | 1 | 1 |
| Somashif MPE-100 | 3 | 3 | 4 | — | — |
| Weatherability |  |  |  |  |  |

TABLE 4-continued

|  | Ex. 16 | Ex. 17 | Ex. 18 | Comp. Ex. 8 | Comp. Ex. 9 |
|---|---|---|---|---|---|
| Evaluation |  |  |  |  |  |
| After 300 hours | ○ | ○ | ○ | ○ | ○ |
| After 600 hours | ○ | ○ | ○ | ○ | ○ |
| After 900 hours | ○ | ○ | ○ | ○ | ○ |
| After 1200 hours | ○ | ○ | ○ | ○ | ○ |
| After 1500 hours | ○ | ○ | ○ | X | X |
| After 1800 hours | ○ | ○ | ○ |  |  |
| After 2100 hours | ○ | ○ | ○ |  |  |

EXAMPLES 19 TO 22, AND COMPARATIVE EXAMPLES 10 TO 13

A modified silicone polymer, a filler, a plasticizer, a dehydrating agent, an adhesiveness-giving agent, a silanol-condensing catalyst, a hindered amine light stabilizer, a benzotriazole type ultraviolet absorber, and a phyllosilicate were homogeneously mixed in blended amounts shown in Table 5 under reduced pressure in a mixing stirrer sealed up in such a manner that moisture from the outside could not enter the stirrer, thereby yielding a curable composition.

About the calcium carbonate, calcium carbonate dried at 110° C. in advance under reduced pressure was used.

About the curable compositions obtained in the above-mentioned Examples and Comparative Examples, the following performances were evaluated, and the results are shown in Table 5.

(1) Weatherability

Each of the blend compositions was applied onto a stainless steel plate having a size of 50 mm×150 mm (thickness: 1 mm) so as to have a thickness of 0.5 mm, and then cured. Thereafter, light was radiated under the following conditions. The surface state thereof was evaluated by observation with the naked eye.

Light Radiating Conditions

Test device: Eye Super UV tester "SUV-F11 model", manufactured by Iwasaki Electric Co., Ltd.,
UV intensity: 100 mW/cm$^2$,
Restricted wavelength: 295 to 450 nm
Black panel temperature: 63° C., and
Radiation distance: 235 nm (between a light source and the sample).

The cured films were observed with the naked eye after the light radiation was performed for 400 hours, 600 hours and 1000 hours by means of the above-mentioned test device. The film having on its surface no cracks was judged as goodness (○), and the film having on its surface one or more generated cracks was judged as badness (x).

(2) Adhesiveness to Vinyl Chloride Resin Steel Plate

The above-mentioned curable compositions were evaluated about their adhesiveness according to JIS A 5758.

Various components used in Table 5 are as follows.

[Modified Silicone Polymer]
"MS polymer S-943", manufactured by Kaneka Corp.
"MA-447", manufactured by Kaneka Corp.
"MS polymer S-203", manufactured by Kaneka Corp.

[Filler]
Calcium carbonate ("PLS-515", manufactured by Konosima Chemical Co., Ltd.)

[Plasticizer]
Diol 3000 (manufactured by Mitsui Chemicals, Inc., polypropylene glycol, Mn=3000)
Epoxy ester 1600A (manufactured by Kyoeisya Yushi Co., Ltd. reactant of glycidyl ether of 1,6-hexanediol and acrylic acid)

[Others]
Vinyltrimethoxysilane (dehydrating agent, "Saira Ace S210" manufactured by Chisso Corp.)
KBM-603 (adhesiveness-giving agent, manufactured by Shin-Etsu Chemical Co., Ltd., N-(2-aminoethyl)-3-aminopropyltrimethoxysilane)
Dibutyltin dilaurate (silanol-condensing catalyst)
Sanol LS770 (hindered amine light stabilizer manufactured by Sankyo Co., Ltd.)
Tinuvin 327 (benzotriazole type ultraviolet absorber, manufactured by Chiba Specialty Chemicals Co., Ltd)
Somashif MPE-100 (swellable fluorine mica organically-treated with polyoxypropylene diethyl quaternary ammonium salt, manufactured by Co-op Chemical Co., Ltd.)

TABLE 5

|  |  | Ex. | | | | Comp.Ex. | | | |
|---|---|---|---|---|---|---|---|---|---|
|  |  | 19 | 20 | 21 | 22 | 10 | 11 | 12 | 13 |
| Curable Composition (parts by weight) | Modified Silicone Polymer MS S-943 | 100 | 50 | 100 | 90 | 100 | 50 | 100 | 90 |
|  | Modified Silicone Polymer MS S-203 | — | 50 | — | — | — | 50 | — | — |
|  | MA-447 | — | — | — | 10 | — | — | — | 10 |
|  | Calcium Carbonate | 150 | 150 | 150 | 150 | 150 | 150 | 150 | 150 |
|  | Diol 3000 | 50 | 50 | 50 | 50 | 50 | 50 | 50 | 50 |
|  | Epoxy Ester 1600A | — | — | 5 | — | — | — | 5 | — |
|  | Vinyltrimethoxysilane | 3 | 3 | 3 | 3 | 3 | 3 | 3 | 3 |
|  | KBM-603 | 2 | 2 | 2 | 2 | 2 | 2 | 2 | 2 |
|  | Dibutyltin Dilaurate | 2 | 2 | 2 | 2 | 2 | 2 | 2 | 2 |
|  | Sanol LS770 | 1 | 1 | 1 | 1 | 1 | 1 | 1 | 1 |

TABLE 5-continued

|  |  | Ex. | | | | Comp.Ex. | | | |
| --- | --- | --- | --- | --- | --- | --- | --- | --- | --- |
|  |  | 19 | 20 | 21 | 22 | 10 | 11 | 12 | 13 |
|  | Tinuvin 327 | 1 | 1 | 1 | 1 | 1 | 1 | 1 | 1 |
|  | Somashif MPE-100 | 5 | 5 | 5 | 5 | — | — | — | — |
| Weatherability | After Radiation for 400 hours | ◯ | ◯ | ◯ | ◯ | ◯ | ◯ | ◯ | ◯ |
|  | After Radiation for 600 hours | ◯ | ◯ | ◯ | ◯ | ◯ | X | ◯ | ◯ |
|  | After Radiation for 1000 hours | ◯ | X | ◯ | ◯ | X | X | X | X |
| Adhesive | Maximum Tensile Strength (kPa) | 500 | 400 | 640 | 600 | 500 | 400 | 640 | 600 |
|  | Maximum Elongation (%) | 400 | 300 | 460 | 500 | 400 | 300 | 460 | 500 |
|  | Failure State | Interface | Cohesion | Cohesion | Cohesion | Interface | Cohesion | Cohesion | Cohesion |

Notes)
Interface: interfacial rupture,
Cohesion: Cohesive rupture

EXAMPLE 23, AND COMPARATIVE EXAMPLES 14 TO 16

REFERENCE EXAMPLE 1

Preparation of a Vinyl Polymer (L)

Into a 2 L separable flask equipped with a stirrer, a cooler, a thermometer and a nitrogen gas inlet were charged 100 g of n-butyl acrylate, 0.5 g of 3-methacryloyloxypropyltrimethoxysilane (Shin-Etsu Chemical Co., Ltd., article No.: KBM-503), 0.2 g of 3-mercaptopropyltrimethoxysilane (Shin-Etsu Chemical Co., Ltd., article No.: KBM-803), 0.1 g of laurylmercaptan (manufactured by Wako Pure Chemicals, Industries), and 100 g of ethyl acetate, and then the components were mixed. The mixed monomer solution was bubbled with nitrogen gas for 20 minutes, to remove dissolved oxygen. Thereafter, the inside of the separable flask system was substituted with nitrogen gas. While the solution was stirred, the temperature thereof was raised until reflux started. After the reflux, into the polymerization system was poured a solution wherein 0.024 g of 1,1-di(t-hexylperoxy)-3,3,5-trimethylcyclohexane as a polymerization initiator was diluted with 1 g of ethyl acetate. After one hour, into the polymerization system was poured a solution wherein 0.036 g of 1,1-di(t-hexylperoxy)-3,3,5-trimethylcyclohexane was diluted with 1 g of ethyl acetate. Furthermore, into the system were poured solutions wherein 0.048 g, 0.12 g and 0.36 g of di(3,5,5-trimethylhexanoyl)peroxide were separately diluted with 1 g of ethyl acetate after 2, 3 and 4 hours, respectively, from the start of the polymerization. After 7 hours from the first pouring of the polymerization initiator, the temperature was cooled to room temperature so as to finish the polymerization. An ethyl acetate solution of an acrylic polymer containing an alkoxysilyl group and having a number-average molecular weight of about 50,000 (the molecular weight being based on polystyrene standard through gel permeation chromatography) was yielded. The viscosity thereof after ethyl acetate was removed with a rotary evaporator was about 300,000 cps (25° C.). The viscosity was measured with a Brookfield type viscometer (manufactured by Tokyo Keiki Co., Ltd.).

REFERENCE EXAMPLE 2

Preparation of a Reactive Diluting Agent

Into a 2 L separable flask equipped with a stirrer, a cooler, a thermometer and a nitrogen gas inlet were charged 100 g of n-butyl acrylate, 5.0 g of 3-methacryloyloxypropyltrimethoxysilane (Shin-Etsu Chemical Co., Ltd., article No.: KBM-503), 5.0 g of laurylmercaptan (manufactured by Wako Pure Chemicals, Industries), and 100 g of ethyl acetate, and then the components were mixed. The mixed monomer solution was bubbled with nitrogen gas for 20 minutes, to remove dissolved oxygen. Thereafter, the inside of the separable flask system was substituted with nitrogen gas. While the solution was stirred, the temperature thereof was raised until reflux started. After the reflux, into the polymerization system was poured a solution wherein 0.024 g of 1,1-di(t-hexylperoxy)-3,3,5-trimethylcyclohexane as a polymerization initiator was diluted with 1 g of ethyl acetate. After one hour, into the polymerization system was poured a solution wherein 0.036 g of 1,1-di(t-hexylperoxy)-3,3,5-trimethylcyclohexane was diluted with 1 g of ethyl acetate. Furthermore, into the system were poured solutions wherein 0.048 g, 0.12 g and 0.36 g of di(3,5,5-trimethylhexanoyl) peroxide were separately diluted with 1 g of ethyl acetate after 2, 3 and 4 hours, respectively, from the start of the polymerization. After 7 hours from the first pouring of the polymerization initiator, the temperature was cooled to room temperature so as to finish the polymerization. An ethyl acetate solution of a reactive dilution agent containing an alkoxysilyl group and having a number-average molecular weight of about 3,000 (the molecular weight being based on polystyrene standard through gel permeation chromatography) was yielded. The viscosity thereof after ethyl acetate was removed with a rotary evaporator was about 2500 cps (25° C.). The viscosity was measured with a Brookfield type viscometer (manufactured by Tokyo Keiki Co., Ltd.).

EXAMPLE 23

After 100 g of the vinyl polymer (L) obtained in Reference Example 1 was mixed with 50 g of the reactive diluting agent obtained in Reference Example 2, ethyl acetate was removed with a rotary evaporator to yield a viscous liquid curable composition. The viscosity of this composition was about 30000 cps at 25° C. To the resultant liquid curable composition were further added 20 g of calcium carbonate surface-treated with a fatty acid, 50 g of heavy calcium carbonate, 5 g of titanium dioxide, 2 g of vinyltrimethoxysilane, and 3 g of a curing promoter (dibutyltin dilaurate). The components were mixed until the solution turned homogeneous in a sealed stirrer. Thereafter, the solution was degassed under reduced pressure for 10 minutes, to yield a white pasty room-temperature-curable composition.

The resultant curable composition was applied onto a polyethylene plate to have a thickness of 2.5 mm, and subsequently the resultant was cured in an atmosphere having a temperature of 20° C. and a relative humidity of 50% for 7 days to give a rubbery sheet coating. By the following evaluating methods, evaluation in Example 23 was made. Comparative Examples 14 to 16, which will be described below, were evaluated in the same way.

(Evaluating Methods)

[Rubber Property]

The rubbery sheets yielded in the Example and Comparative Examples, which were cured in the atmosphere having a temperature of 20° C. and a relative humidity of 50% for 7 days, were made into a No. 3 dumbbell shape, and subjected to a tensile test at a crosshead speed of 500 mm/minute according to JIS K 6301. The rupture elongation (%) and the rupture stress (N/mm$^2$) thereof were evaluated.

[Measurement of Usability]

The curable compositions yielded in the Example and Comparative Examples before being cured were each filled into a 333 mL cartridge for sealing material, and then a caulking gun was used to make a jetting-out/bead-applying test. Evaluation thereof was made on the basis of a functional test, and was decided according to the following three ranks:

○: The jetting-out was good, and the bead shape was good.
Δ: The jetting-out was permitted, and the bead shape was bad.
x: The jetting-out was not permitted.

[Volatile Component Evaluation]

The resultant rubbery sheet was cured in an oven at 120° C. for 6 hours, and then evaluated on the basis of weight loss obtained by the following equation:

Weight loss (%)=[(weight before the curing)−(weight after the curing in the oven)]/[(weight before the curing)]

[Bleeding Resistance]

One surface of the rubbery sheet was laminated with a polyethylene film to form a laminated sheet. The laminated sheet was cured in an oven at 60° C. for 14 days, and then the polyethylene film was peeled from the rubbery sheet obtained from the curable composition of the present invention. Each surface thereof was observed with the naked eye and was touched for evaluation.

About the rubber property of the sheet coating, the rupture elongation was 750%, and the rupture stress was 0.255 N/mm$^2$. About the usability for application, the curable composition was smoothly applied, and the evaluation thereof was good (○). The weight loss based on volatile components from the cured coating was 0.8%. About the bleed resistance, a luster or oily feeling based on bleeding was neither observed with the naked eye nor felt by the touch.

COMPARATIVE EXAMPLE 14

Ethyl acetate was removed from 100 g of the vinyl polymer (L) obtained in Reference Example 1 with a rotary evaporator, to yield a resin made of the vinyl polymer (L). To the resultant resin were further added 13 g of calcium carbonate surface-treated with a fatty acid, 26 g of heavy calcium carbonate, 3 g of titanium dioxide, 1.3 g of vinyltrimethoxysilane, and 2 g of a curing promoter (dibutyltin dilaurate). The components were mixed until the solution turned homogeneous in a sealed stirrer. Thereafter, the solution was degassed under reduced pressure for 10 minutes, to yield a white puttylike room-temperature-curable composition.

The resultant curable composition was applied onto a polyethylene plate to have a thickness of 2.5 mm, and subsequently the resultant was cured in an atmosphere having a temperature of 20° C. and a relative humidity of 50% for 7 days to give a rubbery sheet coating. About the rubber property of the sheet coating, the rupture elongation was 530%, and the rupture stress was 0.196 N/mm$^2$. About the usability for application, smoothly application was very difficult, and the evaluation thereof was bad (x). The weight loss based on volatile components from the cured coating was 0.8%. About the bleed resistance, a luster or oily feeling based on bleeding was neither observed with the naked eye nor felt by the touch.

COMPARATIVE EXAMPLE 15

Ethyl acetate was removed from 100 g of the vinyl polymer (L) obtained in Reference Example 1 with a rotary evaporator, to yield a resin made of the vinyl polymer (L). To the resultant resin were further added 13 g of calcium carbonate surface-treated with a fatty acid, 26 g of heavy calcium carbonate, 3 g of titanium dioxide, 1.3 g of vinyltrimethoxysilane, 2 g of a curing promoter (dibutyltin dilaurate), and 20 g of a diluting agent (xylene). The components were mixed until the solution turned homogeneous in a sealed stirrer. Thereafter, the solution was degassed under reduced pressure for 10 minutes, to yield a white pasty room-temperature-curable composition.

The resultant curable composition was applied onto a polyethylene plate to have a thickness of 2.5 mm, and subsequently the resultant was cured in an atmosphere having a temperature of 20° C. and a relative humidity of 50% for 7 days to give a rubbery sheet coating. About the rubber property of the sheet coating, the rupture elongation was 640%, and the rupture stress was 0.206 N/mm$^2$. About the usability for application, the curable composition was smoothly applied, and the evaluation thereof was good (○). The weight loss based on volatile components from the cured coating was 14%. About the bleed resistance, a luster or oily feeling based on bleeding was neither observed with the naked eye nor felt by the touch.

COMPARATIVE EXAMPLE 16

After 100 g of the vinyl polymer (L) obtained in Reference Example 1 was mixed with 25 g of polypropylene glycol (manufactured by Asahi Glass Co., Ltd., Excenol 3020), ethyl acetate was removed with a rotary evaporator to yield a viscous liquid curable composition. The viscosity of this composition was about 30,000 cps at 25° C. To the resultant liquid curable composition were further added 20 g of calcium carbonate surface-treated with a fatty acid, 50 g of heavy calcium carbonate, 5 g of titanium dioxide, 2 g of vinyltrimethoxysilane, and 3 g of a curing promoter (dibutyltin dilaurate). The components were mixed until the solution turned homogeneous in a sealed stirrer. Thereafter, the solution was degassed under reduced pressure for 10 minutes, to yield a white pasty room-temperature-curable composition.

The resultant curable composition was applied onto a polyethylene plate to have a thickness of 2.5 mm, and subsequently the resultant was cured in an atmosphere having a temperature of 20° C. and a relative humidity of 50% for 7 days to give a rubbery sheet coating. About the rubber property of the sheet coating, the rupture elongation was 730%, and the rupture stress was 0.235 N/mm². About the usability for application, the curable composition was smoothly applied, and the evaluation thereof was good (○). The weight loss based on volatile components from the cured coating was 0.8%. About the bleed resistance, a luster was observed on the surface from which the polyethylene film was peeled, and bleeding of oil was felt from finger touch.

EXAMPLES 24 TO 26, AND COMPARATIVE EXAMPLES 17 AND 18

The polymer A or polymer B used in Examples 17 to 18, stearylamine, a filler, a plasticizer, a dehydrating agent, an adhesiveness-giving agent, a silanol-condensing catalyst, a hindered amine light stabilizer, a benzotriazole type ultraviolet absorber, and a phyllosilicate were homogeneously mixed in blended amounts shown in Table 6 under reduced pressure in a mixing stirrer sealed up in such a manner that moisture from the outside could not enter the stirrer, thereby yielding each of curable compositions of Examples 24 to 26 and Comparative Examples 17 and 18.

Details of the respective components are as follows.

(a) Base Resins
Polymer A
Polymer B (b) Fillers
Calcium Carbonate (Manufactured by Shiraishi Kogyo Kaisha, Ltd., Article No.: CCR, Dried at 110° C. in Advance Under Reduced Pressure)
Titanium oxide (manufactured by Ishihara Sangyo Kaisha, Ltd., article No.: R-820)

(c) Plasticizer
Polypropylene Glycol (Mitsui Chemicals, Inc., Diol 3000, Mn=3000)

(d) Other additives
Dehydrating Agent (Vinyltrimethoxysilane, Manufactured by Chisso Corp., Trade Name: "Saira Ace S210")
Adhesiveness-Giving Agent (N-(2-aminoethyl)-3-aminopropyltrimethoxysilane, Manufactured by Shin-Etsu Chemical Co., Ltd., KBM-603)
Silanol-Condensing Catalyst (Dibutyltin Dilaurate) Hindered Amine Light Stabilizer (Manufactured by Sankyo Co., Ltd., Article No.: Sanol LS770)
Benzotriazole Type Ultraviolet Absorber (Manufactured by Chiba Specialty Chemicals Co.,Ltd., Aarticle No.: Tinuvin 327)
Phyllosilicate (Swellable Fluorine Mica Organically-Treated with Polyoxypropylene Diethyl Quaternary Ammonium Salt, Manufactured by Co-op Chemical Co., Ltd., Trade Name: Somashif MPE-100)

EVALUATION OF EXAMPLES 24 TO 26, AND COMPARATIVE EXAMPLES 17 AND 18

About each of the curable compositions, ① the weatherability and ② the contamination resistance were evaluated in the following manners.

① Weatherability: The weatherability was evaluated in the same manner as in Example 1.

② Contamination resistance: The test plates produced in the ① were allowed to stand still in the open air for one month. After the one month, a change in the color difference thereof was measured with a color-difference meter. ○ (goodness) was attached to the case that the change in the color difference was 3 or less, and x (badness) was attached to the case that the change in the color difference was more than 3.

TABLE 6

|  | Ex. 24 | Ex. 25 | Ex. 26 | Comp. Ex. 17 | Comp. Ex. 18 |
| --- | --- | --- | --- | --- | --- |
| Polymer | Polymer A | Polymer A | Polymer B | Polymer A | Polymer B |
| Calcium Carbonate | 100 | 100 | 100 | 100 | 100 |
| Titanium Oxide | 20 | 20 | 20 | 20 | 20 |
| Dial 3000 | 50 | 50 | 50 | 50 | 50 |
| Stearylamine | 1 | 2 | 2 |  |  |
| Vinyltrimethaxysilane | 3 | 3 | 3 | 3 | 3 |
| N-(2-aminoethyl)-3-aminopropyl-trimethoxysilane | 2 | 2 | 2 | 2 | 2 |
| Dibutyltin Dilaurate | 2 | 2 | 2 | 2 | 2 |
| Sanol LS770 | 1 | 1 | 1 | 1 | 1 |
| Tinuvin 327 | 1 | 1 | 1 | 1 | 1 |
| Somashif MPE-100 |  | 3 | 4 | — | — |
| Weatherability Evaluation |  |  |  |  |  |
| After 300 hours | ○ | ○ | ○ | ○ | ○ |
| After 600 hours | ○ | ○ | ○ | ○ | ○ |
| After 900 hours | ○ | ○ | ○ | ○ | ○ |
| Contamination Resistance | ○ | ○ | ○ | X | X |

EXAMPLES 27 TO 30, AND COMPARATIVE EXAMPLES 19 AND 20

The polymer A or B used in Examples 16 to 18 and the following materials were prepared.

[Filler]
Calcium carbonate ("CCR" manufactured by Shiraishi Kogyo Kaisha Ltd.)
Titanium oxide ("R-820" manufactured by Ishihara Sangyo Kaisha, Ltd.)

[Others]
Vinyltrimethoxysilane (dehydrating agent, "Saira Ace S210" manufactured by Chisso Corp.)
Dibutyltin dilaurate (silanol-condensing catalyst)
Sanol LS770 (hindered amine light stabilizer, manufactured by Sankyo Co.)
Tinuvin 327 (benzotriazole type ultraviolet absorber, manufactured by Chiba Specialty Chemicals Co.)

Somashif MPE-100 (swellable fluorine mica organically-treated with polyoxypropylene diethyl quaternary ammonium salt, manufactured by Co-op Chemical Co., Ltd.)

Epicoat 828 (bisphenol A type epoxy compound, manufactured by Japan Epoxy)

Silane compound containing an epoxy group, manufactured by Shin-Etsu Chemical Co., Ltd., KBM-403 (3-glycidoxypropyltrimethoxysilane)

Ketimine compound containing a hydrolyzable silyl group, manufactured by Shin-Etsu Chemical Co., Ltd., KBE-9103 (3-triethoxysilyl-N-(1,3-dimethyl-butylidene)propylamine The polymer A or polymer B, the epoxy group-containing silyl compound, the ketimine compound, the epoxy compound, the filler, the plasticizer, the dehydrating agent, the adhesiveness-giving agent, the silanol-condensing catalyst, the hindered amine light stabilizer, the benzotriazole type ultraviolet absorber, and the phyllosilicate were homogeneously mixed in blended amounts shown in Table 7 described below under reduced pressure in a mixing stirrer sealed up in such a manner that moisture from the outside could not enter the stirrer, thereby yielding curable compositions.

About the calcium carbonate, calcium carbonate dried at 110° C. in advance under reduced pressure was used.

About the curable compositions obtained in the above-mentioned Examples 27 to 30 and Comparative Examples 19 and 20, the performances thereof were evaluated in the following manners.

The results are shown in Table 7 described below.

(1) Weatherability: The weatherability was evaluated in the same manner as in Example 1.

(2) Adhesiveness endurance

Each of the curable compositions was used to adhere a mosaic tile and a ceramic siding material to each other, and then the resultant was cured at a temperature of 23±2° C. and 50±5 RH % for 672 hours on the basis of "Quality Standard Plan for Adhesives for Exterior Tiles and Stone-Finishing System Using Organic Adhesives". Thereafter, an alkaline hot water test was made as an ageing test in a manner described below, and subsequently a tensile test was made. As a judging criterion, compositions satisfying an adhesive strength of 0.4 N/mm$^2$ or more were judged as goodness (○).

Alkaline hot water test: Calcium hydroxide having a temperature of 60±2° C. was immersed into an aqueous saturated solution thereof for 168 hours.

TABLE 7

|  | Ex. 27 | Ex. 28 | Ex. 29 | Ex. 30 | Comp. Ex. 19 | Comp. Ex. 20 |
| --- | --- | --- | --- | --- | --- | --- |
| Vinyl Polymer | Polymer A | Polymer A | Polymer A | Polymer B | Polymer A | Polymer B |
| (Added Amount) | (100) | (100) | (100) | (100) | (100) | (100) |
| Epoxysilane Compound | 10 | 3 | 2 | 4 | 5 | — |
| Ketiminesilane Compound | 2 | 2 | 3 | 4 | — | 5 |
| Epoxy Compound (Epicoat 828) | None | 10 | 5 | 10 | 20 | 20 |
| Calcium Carbonate | 100 | 100 | 100 | 100 | 100 | 100 |
| Titanium Oxide | 20 | 20 | 20 | 20 | 20 | 20 |
| Vinyltrimethoxysilane | 3 | 3 | 3 | 3 | 3 | 3 |
| Dibutyltin Dilaurate | 2 | 2 | 2 | 2 | 2 | 2 |
| Sanol LS770 | 1 | 1 | 1 | 1 | 1 | 1 |
| Tinuvin 327 | 1 | 1 | 1 | 1 | 1 | 1 |
| Somashif MPE-100 | — | — | — | 4 | — | — |
| Weatherability Evaluation |  |  |  |  |  |  |
| After 300 hours | ○ | ○ | ○ | ○ | ○ | ○ |
| After 600 hours | ○ | ○ | ○ | ○ | ○ | ○ |
| After 900 hours | ○ | ○ | ○ | ○ | ○ | ○ |
| Adhesiveness Endurance | X | ○ | ○ | ○ | X | X |

EXAMPLES 31 AND 32, AND COMPARATIVE EXAMPLE 21

The following were used: a polymer having as its main chain polyoxypropylene and having at its terminal a dimethoxysilane group (trade name "Excestar 2410", manufactured by Asahi glass Co., Ltd., molecular weight: 17000), 3-glycidoxypropyltrimethoxysilane (trade name "TSL 8350", manufactured by Toshiba Silicone Co., Ltd.), a ketimine compound represented by the following formula (trade name "S340", manufactured by Chisso Corp.): and a phyllosilicate (trade name: "Somashif MPE-100" manufactured by Co-op Chemical Co., Ltd.).

Furthermore, the following were used: dibutyltin laurate, vinyltrimethoxysilane, N-(aminoethyl)-3-aminopropyltrimethoxysilane (trade name: "TSL 8340", manufactured by Toshiba Silicone Co., Ltd.), and calcium carbonate, titanium oxide and dioctylphthlate as other additives, Furthermore, a Tinuvin 327 as an ultraviolet absorber, and a Sanol LS770 as a light stabilizer were prepared.

The above-mentioned various components were homogeneously mixed in a mixing stirrer in accordance with the compositions shown in Table 8 described below, thereby yielding room-temperature-curable compositions.

About the room-temperature-curable compositions obtained in Examples 31 and 32 and Comparative Example 21, an adhesiveness test, a tensile strength test and a weatherability test were made in the following manners.

(Adhesiveness Test)

An aluminum plate and a vinyl chloride steel plate were used, as adhesion-undergoing products, to make H-shaped test pieces based on JIS A 5758. The test pieces were cured at 23° C. and a relative humidity of 60% for 2 weeks, and then subjected to a tensile test at a speed of 50 mm/minute so as to evaluate the adhesiveness thereof.

(Tensile Strength Test)

Sheets made of the room-temperature-curable compositions having a thickness of 2 mm were cured at 23° C. and a relative humidity of 60% for one week. Thereafter, they were made into No. 3 dumbbell test pieces and the test pieces were subjected to a tensile test at a speed of 50 mm/minute according to JIS K 6301 so as to evaluate the elongation percentage thereof.

(Weatherability Test)

A pigment (NV-6-2129, manufactured by Nippon Pigment Co., Ltd.) was blended with each of the adhesives at each ratio shown in Table 2. The resultant curable composition was applied onto an aluminum plate of 1 mm thickness so as to have a thickness of 0.1 mm, and then cured at 20° C. and a relative humidity of 55% for 14 hours to yield a weatherability test piece. This test piece was irradiated with light from a sunshine wetherometer for 4000 hours. The surface thereof before and after the irradiation was observed. The observation was made as to whether cracks were generated or not and as to the color thereof. The weatherability was evaluated as the color difference (ΔE) before and after the irradiation. As the ΔE is smaller, the weatherability is better.

As is clear from Table 8, Examples 31 and 32 had far more improved weatherability as compared with Comparative Example 20 by the incorporation of the phyllosilicate.

TABLE 8

| | | Ex. 31 | Ex. 32 | Comp. Ex. 21 |
|---|---|---|---|---|
| | Polymer(A) | 100 | 100 | 100 |
| | 3-Glycidoxy-propyltrimethoxysilane (B) | 2 | 2 | 2 |
| | Ketimine Compound | 2 | 2 | 2 |
| | Somashif MPE | 3 | 5 | — |
| | Dibutyltin Dilaurate | 2 | 2 | 2 |
| | Vinyltrimethoxysilane | 2 | 2 | 2 |
| | N-(aminoethyl)-3-aminopropyl-trimethoxysilane | — | — | — |
| | Dioctyl Phthalate | 30 | 30 | 30 |
| | Calcium Carbonate | 100 | 100 | 100 |
| | Titanium Oxide | 20 | 20 | 20 |
| | Sanol LS770 | 2 | 2 | 2 |
| | Tinuvin 327 | 2 | 2 | 2 |
| | Pigment | 20 | 20 | 20 |
| To Aluminum | Tensile Strength (kPa) | 638 | 657 | 648 |
| | Elongation(%) | 444 | 421 | 431 |
| | Rupture Form | Cohesion | Cohesion | Cohesion |
| To Vinyl Chloride | Tensile Strength (kPa) | 657 | 608 | 618 |
| | Elongation(%) | 435 | 420 | 421 |
| | Rupture Form | Cohesion | Cohesion | Cohesion |
| Weatherability | Surface Observation | No Abnormality | No Abnormality | Generation of Cracks |
| | ΔE | 1.2 | 0.8 | 5.4 |

EXAMPLE 33 AND COMPARATIVE EXAMPLE 22

Respective room-temperature curable compositions having compositions shown as Comparative Example 22 and Example 33 in Table 9 described below were yielded in the same way as in Examples 31 and 32 and Comparative Example 21 except that N,N'-bis-[3-(trimethoxysilyl)propyl]ethylenediamine was used instead of 3-glycidoxypropylmethoxysilane and the ketimine compound.

About the thus-obtained room-temperature-curable compositions, an adhesiveness test, a tensile strength test and a weatherability test were made in the same way as in Examples 31 and 32. The results are shown in the following Table 9.

As is clear from Table 9, the curable composition of Example 33 exhibited a sufficient adhesiveness to aluminum and the vinyl chloride steel plate, had a good rubbery elasticity, and further had a better weatherability as compared with Comparative Example 22.

TABLE 9

| | | Ex. 33 | Comp. Ex. 22 |
|---|---|---|---|
| | Polymer(A) | 100 | 100 |
| | N,N'-bis-[3-(trimethoxysilyl)propyl]ethylenediamine | 5 | 5 |
| | 3-Glycidoxy-propyltrimethoxysilane (B) | 2 | 2 |
| | Dibutyltin Dilaurate | 3 | 3 |
| | clay | 5 | — |
| | N-(aminoethyl)-3-aminopropyl-trimethoxysilane | — | — |
| | Dioctyl Phthalate | 30 | 30 |
| | Calcium Carbonate | 100 | 100 |
| | Titanium Oxide | 20 | 20 |
| | Tinuvin 327 | 2 | 2 |
| | Sanol LS770 | 2 | 2 |
| To Aluminum | Tensile Strength (kPa) | 383 | 579 |
| | Elongation(%) | 150 | 140 |
| | Rupture Form | Cohesion | Cohesion |
| To Vinyl Chloride | Tensile Strength (kPa) | 540 | 549 |
| | Elongation(%) | 145 | 130 |
| | Rupture Form | Cohesion | Cohesion |
| Weatherability | Surface Observation | No Abnormality | Generation of Cracks |
| | ΔE | 0.9 | 4.4 |

EXAMPLE 34 AND COMPARATIVE EXAMPLE 23

POLYMERIZATION EXAMPLE 1

Into a 2 L separable flask equipped with a stirrer, a cooler, a thermometer and a nitrogen gas inlet were charged 100 g of n-butyl acrylate, 0.5 g of 3-methacryloyloxypropyltrimethoxysilane (Shin-Etsu Chemical Co., Ltd., article No.: KBM-503), 0.2 g of 3-mercaptopropyltimethoxysilane (Shin-Etsu Chemical Co., Ltd., article No.: KBM-803), 0.1 g of laurylmercaptan (manufactured by Wako Pure Chemicals, Industries), and 100 g of ethyl acetate, and then the components were mixed. The mixed monomer solution was bubbled with nitrogen gas for 20 minutes, to remove dissolved oxygen. Thereafter, the inside of the separable flask system was substituted with nitrogen gas. While the solution was stirred, the temperature thereof was raised until reflux started.

After the reflux, into the polymerization system was poured a solution wherein 0.024 g of 1,1-di(t-hexylperoxy)-3,3,5-trimethylcyclohexane as a polymerization initiator was diluted with 1 g of ethyl acetate. After one hour, into the polymerization system was poured a solution wherein 0.036 g of 1,1-di(t-hexylperoxy)-3,3,5-trimethylcyclohexane was diluted with 1 g of ethyl acetate. Furthermore, into the system were poured solutions wherein 0.048 g, 0.12 g and 0.36 g of di(3,5,5-trimethylhexanoyl)peroxide were separately diluted with 1 g of ethyl acetate after 2, 3 and 4 hours, respectively, from the start of the polymerization. After 7 hours from the first pouring of the polymerization initiator, the temperature was cooled to room temperature so as to finish the polymerization. An ethyl acetate solution of an acrylic polymer containing an alkoxysilyl group and having a number-average molecular weight of about 50,000 (the molecular weight being based on polystyrene standard through gel permeation chromatography) was yielded.

[Polymerization 2]

Into a 2 L separable flask equipped with a stirrer, a cooler, a thermometer and a nitrogen gas inlet was charged 100 g of ethyl acetate. While the reaction system was stirred and purged with nitrogen, the temperature thereof was raised until reflux started. Thereafter, thereto was added a solution wherein 0.2 g of azobiscyclohexanecarbonitrile was dissolved in 5 g of ethyl acetate. Thereto was dropwise added a mixed solution of 100 g of n-butyl acrylate, 5.0 g of 3-methacryloyloxypropyltrimethoxysilane (Shin-Etsu Chemical Co., Ltd., article No.: KBM-503), and 5.0 g of laurylmercaptan (manufactured by Wako Pure Chemicals, Industries) over 2 hours to polymerize the polymerizable components. After 3 hours from the end of the addition, furthermore, a solution wherein 0.2 g of azobiscyclohexanecarbonitrile was dissolved in 5 g of ethyl acetate was dropwise added to the solution. Thereafter, the reaction system was further refluxed for 2 hours. Subsequently, the temperature thereof was cooled to room temperature to finish the polymerization. An ethyl acetate solution of a reactive dilution agent containing an alkoxysilyl group and having a number-average molecular weight of about 50,000 (the molecular weight being based on polystyrene standard through gel permeation chromatography) was yielded.

EXAMPLE 34

Ethyl acetate was removed from 100 g of the ethyl acetate solution of the polymer, obtained by use of the peroxide initiator obtained in Polymerization Example 1, with a rotary evaporator to yield a viscous liquid curable composition. To the resultant liquid curable composition was added 2 g of a curing promoter (dibutyltin dilaurate), and the components were mixed until the solution turned homogeneous in a sealed stirring/degassing device, so as to yield a transparent viscous room-temperature-curable composition. The resultant curable composition was applied onto a polyethylene plate to have a thickness of 1.0 mm, and subsequently the resultant was cured in an atmosphere having a temperature of 20° C. and a relative humidity of 50% for 7 days to give a rubbery sheet coating.

By the following methods, the coating was evaluated about rubber property and yellowing evaluations 1 and 2.

About the rubber property of the sheet coating, the rupture elongation was 350% and the rupture stress was 0.157 N/mm$^2$. Yellowing was observed by the following method. As a result, yellowing was neither recognized in the polymer before being cured nor in the sheet coating after the curing.

[Rubber Property]

The rubbery sheets yielded in the Examples and Comparative Examples, which were cured in the atmosphere having a temperature of 20° C. and a relative humidity of 50% for 7 days, were made into a No. 3 dumbbell shape, and subjected to a tensile test at a crosshead speed of 500 mm/minute according to JIS K 6301. The rupture elongation (%) and the rupture stress (N/mm$^2$) thereof were evaluated.

[Yellowing Evaluation 1]

Each of the polymers obtained in Polymerization Examples 1 and 2, from which the solvent was removed, was put into a 100 mL glass bottle, and cured at 30° C. for 180 days. Thereafter, the color state thereof was watched with the naked eye.

[Yellowing Evaluation 2]

The cured sheet coatings were cured in an oven of 100° C. temperature for 30 days, and then the appearances thereof were observed with the naked eye.

COMPARATIVE EXAMPLE 23

Ethyl acetate was removed from 100 g of the ethyl acetate solution of the polymer, obtained by use of the azo type initiator obtained in Polymerization Example 2, with a rotary evaporator to yield a viscous liquid curable composition. To the resultant liquid curable composition was added 2 g of a curing promoter (dibutyltin dilaurate), and the components were mixed until the solution turned homogeneous in a sealed stirring/degassing device, so as to yield a transparent viscous room-temperature-curable composition. The resultant curable composition was applied onto a polyethylene plate to have a thickness of 1.0 mm, and subsequently the resultant was cured in an atmosphere having a temperature of 20° C. and a relative humidity of 50% for 7 days to give a rubbery sheet coating. The rubber property and yellowing thereof were evaluated in the same way as in Example 34.

About the rubber property of the sheet coating, the rupture elongation was 330% and the rupture stress was 0.118 N/mm$^2$. Yellowing was observed. As a result, yellowing was recognized in both of the polymer before being cured and the sheet coating after the curing.

EXAMPLE 35

The following were blended as shown in Table 1: modified silicone polymers (manufactured by Kaneka Corp., number-average molecular weight 20,000 "MS polymer S-203" and number-average molecular weight 20,000 "MS polymer S-303" as organic polymers having at least one silicon-containing group crosslinkable by the formation of a siloxane bond, calcium carbonate (manufactured by Shiraishi Kogyo Co., "Hakuenka A", non-treated calcium carbonate having an average particle size of 1.0 μm) and titanium oxide as fillers, polypropylene glycol (manufactured by Mitsui Chemicals, Inc., "Diol 3000", number-average molecular weight: 3000) as a plasticizer, vinyltrimethoxysilane (manufactured by Chisso Corp., "Saira Ace S210") as a dehydrating agent, N-(2-aminoethyl)-3-aminopropyltrimethoxysilane (manufactured by Shin-Etsu Chemical Co., Ltd., "KBM-603") as an adhesiveness-giving agent, dibutyltin dilaurate as a silanol-condensing catalyst, bis(2, 2,6,6-tetramethyl-4-piperidyl)sebacate (manufactured by Chiba Specialty Chemicals Co., "Tinuvin 770"), and a mixture of bis(1,2,2,6,6-pentamethyl-4-piperidyl) sebacate and methyl 1,2,2, 6, 6-pentamethyl-4-piperidylsebacate (manufactured by Chiba Specialty Chemicals Co., "Tinuvin 770") as hindered amine light stabilizers, a benzotriazole type ultraviolet absorber (manufactured by Chiba Specialty Chemicals Co., "Tinuvin 327"), and a phyllosilicate (manufactured by Co-op Chemical Co., Ltd., "Somashif MPE-100": swellable fluorine mica organically-treated with polyoxypropylene diethyl quaternary ammonium salt). The components were homogeneously mixed under reduced pressure in a mixing stirrer sealed up in such a manner that moisture from the outside could not enter the stirrer, thereby yielding a curable composition. About the calcium carbonate and the titanium oxide, those dried at 110° C. in advance under reduced pressure were used.

COMPARATIVE EXAMPLE 24

The same blending as in Example 35 was performed except that a "Hakuenka AA" (calcium carbonate treated with resin acid and having an average particle size of 0.05 μm) manufactured by Shiraishi Kogyo Co. was used as calcium carbonate.

[Check of Average Interlayer Distance of Phyllosilicate]

The average interlayer distance of the phyllosilicate in the resultant curable composition was measured as follows.

An X-ray diffractometry device (manufactured by Rigaku Corp., RINT1100) was used to measure the 2θ of a diffraction peak obtained by analysis of laminated planes of the phyllosilicate, and the following Bragg's diffraction equation was used to calculate the interval between the (001) planes of the phyllosilicate. The following d was used as average interlayer distance.

$\lambda = 2d \sin \theta$ ($\lambda = 0.154$, d: the lattice plane distance of the phyllosilicate, and θ: the diffraction angle)

The case that the average interlayer distance was 3 nm or more was judged as goodness (○).

[Check of Dispersion State of Phyllosilicate]

From a transmission electron microscope (TEM "JEM-1200 EXII" manufactured by JEOL Ltd.) photograph, the dispersion state of the phyllosilicate in the cured article was observed. The case that the phyllosilicate was present in the form of 5 or less layers was judged as goodness (○).

[Evaluation]

The curable compositions obtained in the above-mentioned Example 35 and Comparative Example 24 were evaluated as sealing materials by the following methods. The results are shown in Table 10.

(1) Weatherability

Each of the blend compositions was applied onto a stainless steel plate having a size of 50 mm×150 mm (thickness: 1 mm) so as to have a thickness of 0.5 mm, and the resultant was allowed to stand still in a 20° C., 60% RH atmosphere for 7 days (144 hours) so as to be cured. Thereafter, light was radiated onto the cured article for 150 hours and 400 hours under the following conditions. The surface state thereof was checked with the naked eye, and the case that no cracks were observed was judged as goodness (○).

Light Radiating Conditions

Test device: Eye Super UV tester (SUV-F11 model), manufactured by Iwasaki Electric Co., Ltd., Radiation intensity: 100 mW/cm$^2$, Restricted wavelength: 295 to 450 nm, Black panel temperature: 63° C., and Radiation distance: 235 nm (between a light source and the sample).

(2) Flame Retardancy

Each of the blend compositions was molded to have a width of 25 mm and a thickness of 1 mm, and the resultant was allowed to stand still in a 20° C., 60% RH atmosphere for 7 days (144 hours), so as to be cured. Thereafter, the cured article was put in reducing flames and perpendicularly to the flames for 5 seconds, so as to be positioned 10 mm apart from the tips of the flames.

Thereafter, the cured article was pulled back from the flames. The case that the article did not burn with flames for 5 or more seconds was judged as goodness (○).

EFFECTS OF THE INVENTION

Since the curable composition according to the first invention comprises an organic polymer having at least one crosslinkable hydrolyzable silyl group and a phyllosilicate, the cured article of the composition has a weatherability improved by the ultraviolet absorbing effect of the phyllosilicate itself. In addition, in the case that the curable composition comprises therein an ultraviolet absorber and a light stabilizer, they make the weatherability still higher. Furthermore, the phyllosilicate acts to suppress the bleeding-out of the ultraviolet absorber and the light stabilizer. Thus, the weatherability is made remarkably high. Additionally, the incorporation of the phyllosilicate also causes a rise in the flame retardancy of the cured article obtained by curing the curable composition.

Thus, according to the first invention, it is possible to provide a room-temperature-curable composition which reacts with moisture in the atmosphere so as to be cured, thereby giving a cured article excellent in weatherability and flame retardancy.

In particular, in the case that the phyllosilicate is added at a ratio of 0.1 to 100 parts by weight to 100 parts by weight of the organic polymer, the above-mentioned effect of the addition of the phyllosilicate is made even higher.

In the case that the main chain of the organic polymer is essentially a polyether polymer, the water resistance of the cured article can be made high. In the case that the main chain of the organic polymer is polypropylene oxide, the water resistance of the cured article is high and further a high elasticity is expressed.

In the case that the main chain of the organic polymer is essentially a vinyl polymer, the weatherability is made higher than in the case that the above-mentioned polyether polymer is used.

In the case that a urethane resin, an epoxy resin and/or a modified polysulfide resin is/are incorporated into the first invention, the blend of the resin(s) can cause an improvement in the elasticity, adhesive force, contamination resistance or some other property of the cured article. That is, the incorporation of the urethane resin makes it possible to adjust the elasticity of the cured article, the incorporation of the epoxy resin makes it possible to make the adhesive force of the cured article high, and the incorporation of the modified polysulfide resin makes it possible to improve the contamination resistance.

In the second invention in the present application, a phyllosilicate is incorporated at a ratio of 0.1 to 100 parts by weight to 100 parts by weight of at least one resin selected from the group consisting of a urethane resin, an epoxy resin and/or a modified polysulfide resin. Accordingly, the incorporation of the phyllosilicate causes a rise in the weatherability and the flame retardancy of cured article in the same manner as in the first invention. In the case that the second invention further comprises an ultraviolet absorber and a light stabilizer, the weatherability is made higher accordingly and further the bleeding-out of the ultraviolet absorber and the light stabilizer is suppressed by the phyllosilicate. Consequently, the weatherability can be made remarkably high.

Thus, according to the first and second inventions, it is possible to provide a sealing material or an adhesive excellent in weatherability and flame retardancy.

made of a vinyl polymer, wherein optionally a main chain of the organic polymer is essentially made of a vinyl polymer and/or a polyetherpolymer, and optionally said vinyl polymer is a (meth)acrylic acid ester polymer.

3. The curable composition according to claim 2, wherein the polyether polymer is polyoxypropylene polymer.

4. A curable composition, comprising an organic polymer having at least one crosslinkable hydrolyzable silyl group, and a phyllosilicate, said curable composition comprising a hydrolyzable silyl group repiesented by the following general formula (1):

$$—[Si(R^3)_{2-b}(Y)_bO]_m—Si(R^4)_{3-a}(Y)_a \qquad (1)$$

TABLE 10

|  |  |  |  | Ex. 35 | Comp. Ex. 24 |
|---|---|---|---|---|---|
| Blend Composition | Organic Polymer | Modified Silicone Polymer | MS Polymer S203 (p.b.w.) | 50 | 50 |
|  |  |  | MS Polymer S303 (p.b.w.) | 50 | 50 |
|  | Phyllosilicate |  | Somashif MPE-100 (p.b.w.) | 5 | 5 |
|  | Light Stabilizer |  | Tinuvin 770 (p.b.w.) | 3 | 3 |
|  | Ultraviolet Absorber (Benzotriazol Type) |  | Tinuvin 327 (p.b.w.) | 3 | 3 |
|  | Calcium Carbonate |  | Hakuenka A (p.b.w.) | 150 |  |
|  |  |  | Hakuenka PZ (p.b.w.) |  |  |
|  |  |  | Hakuenka AA (p.b.w.) |  | 150 |
|  | Titanium Oxide |  | (p.b.w.) | 20 | 20 |
|  | Dehydrating Agent |  | Saira Ace S210 (p.b.w.) | 3 | 3 |
|  | Adhesive-Giving Agent |  | KBM-603 (p.b.w.) | 2 | 2 |
|  | Shilanol-condensing Agent |  | Dibutyltin Dilaurate (p.b.w.) | 2 | 2 |
|  | Plasticizer |  | Diol 3000 (p.b.w.) | 40 | 40 |
| Evaluation Results | Average Interlayer Distance of the Phyllosilicate (3 nm or more, or not) |  | (p.b.w.) | ○ | ○ |
|  | Dispersion State of the Phyllosilicate |  | (p.b.w.) | ○ | ○ |
|  | Weatherability (150 hours) |  | (p.b.w.) | ○ | ○ |
|  | Weatherability (400 hours) |  | (p.b.w.) | ○ | X | p.b.w. = parts by weight

The invention claimed is:

1. A curable composition, comprising an organic polymer having at least one crosslinkable hydrolyzable silyl group, and a phyllosilicate, said curable composition comprising at least one resin selected from the group consisting of a urethane resin, an epoxy resin and a modified polysulfide resin, 0.1 to 100 parts by weight of the phyllosilicate being blended per 100 parts by weight of the total of the resin(s) and the organic polymer, said curable composition optionally comprising a light stabilizer, 0.1 to 20 parts by weight of the light stabilizer being blended per 100 parts by weight of base resin made of the organic polymer, said light stabilizer optionally being a hindered amine light stabilizer.

2. A curable composition, comprising an organic polymer having at least one crosslinkable hydrolyzable silyl group, and a phllyosilicate, said curable composition comprising, as the organic polymer, both of an organic polymer (a) wherein its main chain is essentially made of a polyether polymer and an organic polymer (b) wherein its main chain is essentially wherein $R^3$ and $R^4$ each represent an alkyl group having 1 to 20 carbon atoms, an aryl group having 6 to 20 carbon atoms, an aralkyl group having 7 to 20 carbon atoms, or a triorganosiloxy group represented by $(R')_3Si$-(wherein R's are monovalent hydrocarbon groups having 1 to 20 carbon atoms, and three R's may be the same or different); when the number of $R^3$s or $R^4$s is two or more, they may be the same or different; Y represents a hydroxyl group or a hydrolyzable group; when the number of Ys is two or more, they may be the same or different; a represents 0, 1, 2 or 3; b is 0, 1 or 2; and m is an integer of 0 to 19 provided that $a+mb \geq 1$, optionally said phyllosilicate is selected from the group consisting of montmorillonite and swellable mica, and optionally said phyllosilicate is treated with either a quarternary ammonium salt, an alkylammonium ion having a an alkyl chain having 6 or more carbon atoms or a polyoxyalkylene chain.

5. A curable composition, comprising 100 parts by weight of a modified polysulfide resin; and 0.1 to 100 parts by weight of phyllosilicate.

6. A curable composition, comprising an organic polymer having at least one crosslinkable hydrolyzable silyl group, and a phyllosilicate, said curable composition comprising a reactive diluting agent having a viscosity of 10 to 5,000 cps at 25° C., and optionally comprising at least one compound selected from the group consisting of an amine compound, an amide compound, and a fatty acid ester each of which has a melting point of 40–75°, and optionally a silane compound containing an epoxy group, a ketimine compound, and a diamine compound, and optionally an epoxy compound, and optionally further comprising a tetravalent organic tin compound having at least an alkyl groupt with 8 or more carbon atoms and/or a thioether group.

7. A curable composition, comprising an organic polymer having at least one crosslinkable hydrolyzable silyl group, and a phyllosilicate, said organic polymer having the one or more crosslinkable hydrolyzable silyl groups is a polymer obtained by polymerizing a monomer composition containing at least a (meth)acrylic acid ester having at least an alkoxysilyl group by a free-radical polymerization method using a peroxide as a polymerization initiator, and optionally comprising an electrically conducting agent.

* * * * *